US011891040B2

(12) United States Patent
Yuyama

(10) Patent No.: US 11,891,040 B2
(45) Date of Patent: Feb. 6, 2024

(54) VEHICLE ELECTRIC BRAKING DEVICE AND METHOD OF CONTROLLING THE SAME

(71) Applicant: Mitsubishi Electric Corporation, Tokyo (JP)

(72) Inventor: Atsushi Yuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 656 days.

(21) Appl. No.: 17/253,682

(22) PCT Filed: Mar. 7, 2019

(86) PCT No.: PCT/JP2019/009082
§ 371 (c)(1),
(2) Date: Dec. 18, 2020

(87) PCT Pub. No.: WO2020/075322
PCT Pub. Date: Apr. 16, 2020

(65) Prior Publication Data
US 2021/0188233 A1 Jun. 24, 2021

(30) Foreign Application Priority Data
Oct. 9, 2018 (JP) ................................ 2018-190601

(51) Int. Cl.
*B60T 13/74* (2006.01)
*B60T 8/92* (2006.01)
(Continued)

(52) U.S. Cl.
CPC ............... *B60T 8/92* (2013.01); *B60T 8/885* (2013.01); *B60T 13/74* (2013.01); *B60T 17/221* (2013.01);
(Continued)

(58) Field of Classification Search
CPC . B60T 8/92; B60T 8/885; B60T 13/74; B60T 17/221; B60T 2270/402;
(Continued)

(56) References Cited

U.S. PATENT DOCUMENTS

2008/0296106 A1\* 12/2008 Nilsson .................. B60T 8/345
701/115
2011/0156623 A1\* 6/2011 Nakamura .............. H02P 21/06
318/400.02
(Continued)

FOREIGN PATENT DOCUMENTS

JP 3941243 B2 7/2007
JP 2015-154694 A 8/2015
(Continued)

OTHER PUBLICATIONS

International Search Report for PCT/JP2019/009082, dated May 7, 2019.

*Primary Examiner* — Nicholas J Lane
(74) *Attorney, Agent, or Firm* — Sughrue Mion, PLLC; Richard C. Turner

(57) ABSTRACT

The present application provides a vehicle electric braking device that can safely stop a vehicle even when a failure occurs.
The vehicle electric braking device includes a wheel brake which is connected to a power source mounted on a vehicle and performs braking operation of a brake mechanism of wheels of vehicle. In the vehicle electric braking device, wheel brake includes: a motor which has two sets of independent coil windings, a first coil winding and a second coil winding, and drives a braking mechanism of the wheels of vehicle; a first control unit which is connected to the first coil winding of motor and controls motor; and a second control unit which is connected to the second coil winding
(Continued)

of motor and controls motor. Then, wheel brake is provided on at least any one of the wheels of vehicle.

21 Claims, 10 Drawing Sheets

(51) Int. Cl.
  *B60T 8/88* (2006.01)
  *B60T 17/22* (2006.01)
  *H02K 7/102* (2006.01)
  *H02P 27/06* (2006.01)
  *H02P 29/024* (2016.01)

(52) U.S. Cl.
  CPC ............ *H02K 7/102* (2013.01); *H02P 27/06* (2013.01); *H02P 29/024* (2013.01); *B60T 2270/402* (2013.01); *B60T 2270/403* (2013.01); *B60T 2270/406* (2013.01)

(58) Field of Classification Search
  CPC ......... B60T 2270/403; B60T 2270/406; H02P 27/06; H02P 29/024; H02P 29/028
  See application file for complete search history.

(56) References Cited

U.S. PATENT DOCUMENTS

| | | | |
|---|---|---|---|
| 2011/0204839 A1* | 8/2011 | Mukai | B62D 5/0487 |
| | | | 318/724 |
| 2013/0257328 A1* | 10/2013 | Arai | H02P 29/032 |
| | | | 318/400.22 |
| 2017/0012569 A1 | 1/2017 | Koseki et al. | |
| 2017/0217481 A1 | 8/2017 | Asao et al. | |
| 2018/0093698 A1* | 4/2018 | Urimoto | H02K 15/0062 |
| 2019/0016371 A1* | 1/2019 | Urimoto | H02K 11/33 |
| 2019/0052218 A1* | 2/2019 | Sakashita | H02P 7/282 |
| 2019/0334399 A1* | 10/2019 | Masuda | H02K 1/146 |
| 2020/0028463 A1* | 1/2020 | Suzuki | H02P 27/06 |
| 2023/0079985 A1* | 3/2023 | Suzuki | H02P 25/22 |
| | | | 318/496 |
| 2023/0294520 A1* | 9/2023 | Seol | B60T 8/3215 |
| | | | 701/22 |

FOREIGN PATENT DOCUMENTS

| | | |
|---|---|---|
| JP | 2018-038176 A | 3/2018 |
| WO | 2016/063367 A1 | 4/2016 |
| WO | 2018/062097 A1 | 4/2018 |

* cited by examiner

FIG.14

| failure place | power source relay state | | | | driving indication | |
|---|---|---|---|---|---|---|
| | 5a | 5b | 5c | 5d | 3a | 3b |
| no | OFF | OFF | ON | ON | ON | ON |
| 3a inside | OFF | OFF | OFF | ON | OFF | ON |
| 3b inside | OFF | OFF | ON | OFF | ON | OFF |
| 2(3a side) | OFF | OFF | OFF | ON | OFF | ON |
| 2(3b side) | OFF | OFF | ON | OFF | ON | OFF |

FIG.15

| failure place | power source relay state | | | | driving indication | |
|---|---|---|---|---|---|---|
| | 5a | 5b | 5c | 5d | 3a | 3b |
| no | ON | ON | OFF | OFF | ON | ON |
| 3a inside | OFF | ON | OFF | OFF | OFF | ON |
| 3b inside | ON | OFF | OFF | OFF | ON | OFF |
| 2(3a side) | OFF | ON | OFF | OFF | OFF | ON |
| 2(3b side) | ON | OFF | OFF | OFF | ON | OFF |

FIG.16

| failure place | power source relay state | | | | driving indication | |
|---|---|---|---|---|---|---|
| | 5a | 5b | 5c | 5d | 3a | 3b |
| no | ON | ON | ON | ON | ON | ON |
| 3a inside | OFF | ON | OFF | ON | OFF | ON |
| 3b inside | ON | OFF | ON | OFF | ON | OFF |
| 2(3a side) | OFF | ON | OFF | ON | OFF | ON |
| 2(3b side) | ON | OFF | ON | OFF | ON | OFF |

VEHICLE ELECTRIC BRAKING DEVICE AND METHOD OF CONTROLLING THE SAME

CROSS REFERENCE TO RELATED APPLICATIONS

This application is a National Stage of International Application No. PCT/JP2019/009082 filed Mar. 7, 2019, claiming priority based on Japanese Patent Application No. 2018-190601 filed Oct. 9, 2018.

TECHNICAL FIELD

The present application relates to a vehicle electric braking device and a method of controlling the same.

BACKGROUND ART

As a substitution means of a hydraulic braking device which has been used hitherto, development of an electric braking device that obtains vehicle braking force by driving a motor has been being advanced. The braking device has an important function of the vehicle and a redundant system is indispensable so as to be able to safely stop the vehicle even when a failure occurs.

For example, Patent Document 1 discloses a vehicle electric brake device in which two coil windings are arranged in parallel with respect to one motor and even when one side coil winding of two coil windings fails, the motor is driven by the other side normal coil winding.

RELATED ART DOCUMENT

Patent Document

Patent Document 1: JP,3941243,B

SUMMARY OF THE INVENTION

Problems to be Solved by the Invention

In the configuration of the aforementioned conventional Patent Document 1, even if one side coil winding of one motor fails, the vehicle braking force can be obtained by driving the motor by the other side normal coil winding.

However, a problem exists in that the configuration of the aforementioned conventional Patent Document 1 can deal with a failure of the coil winding of the motor; however, there exists only one inverter (three phase bridge circuit) which drives the motor and accordingly the vehicle braking force cannot be obtained when the inverter fails.

The present application discloses a technique which is for solving the foregoing problem and an object of the present application is to provide a vehicle electric braking device that can safely stop a vehicle even when a failure occurs.

Means for Solving the Problems

A vehicle electric braking device disclosed in the present application is a vehicle electric braking device including a wheel brake which is connected to a power source mounted on a vehicle and performs braking operation of a brake mechanism of wheels of the vehicle. In the vehicle electric braking device, the wheel brake includes: a motor which has two sets of independent coil windings, a first coil winding and a second coil winding, and drives a braking mechanism of the wheels of the vehicle; a first control unit which is connected to the first coil winding of the motor and controls the motor; and a second control unit which is connected to the second coil winding of the motor and controls the motor. Then, the wheel brake is provided on at least any one of the wheels of the vehicle.

Furthermore, a method of controlling a vehicle electric braking device disclosed in the present application, includes the steps of: determining the presence or absence of an abnormality in each counterpart central processing unit by a first central processing unit of a first control unit or a second central processing unit of a second control unit; determining the presence or absence of an abnormality in a self central processing unit when no abnormality occurs in the counterpart central processing unit; calculating a normal control amount and outputting a control signal to a first inverter circuit of the first control unit or a second inverter circuit of the second control unit when no abnormality occurs also in the self central processing unit; determining the presence or absence of an abnormality in the self central processing unit when an abnormality occurs in the counterpart central processing unit; calculating a control amount under conditions of abnormality of the counterpart central processing unit and normality of the self central processing unit and outputting a control signal to the first inverter circuit of the first control unit or the second inverter circuit of the second control unit when no abnormality occurs in the self central processing unit; and outputting a control signal that turns OFF to the first inverter circuit of the first control unit or the second inverter circuit of the second control unit when an abnormality occurs in the self central processing unit.

Moreover, a method of controlling a vehicle electric braking device disclosed in the present application, includes the steps of: turning OFF a first power source relay circuit and a second power source relay circuit, turning ON a third power source relay circuit and a fourth power source relay circuit, feeding power from a third power source to a first control unit and a second control unit, and outputting driving indication of turning ON to a first inverter circuit of the first control unit and driving indication of turning ON to a second inverter circuit of the second control unit, when no failure occurs in a wheel brake; turning OFF the first power source relay circuit, the second power source relay circuit, and the third power source relay circuit, keeping the fourth power source relay circuit ON continuously, turning OFF driving indication to the first inverter circuit of the first control unit, and keeping driving indication to the second inverter circuit of the second control unit ON continuously, when a failure occurs in the first inverter circuit of the first control unit; turning OFF the first power source relay circuit, the second power source relay circuit, and the fourth power source relay circuit, keeping the third power source relay circuit ON continuously, turning OFF driving indication to the second inverter circuit of the second control unit, and keeping driving indication to the first inverter circuit of the first control unit ON continuously, when a failure occurs in the second inverter circuit of the second control unit; turning OFF the first power source relay circuit, the second power source relay circuit, and the third power source relay circuit, keeping the fourth power source relay circuit ON continuously, turning OFF driving indication to the first inverter circuit of the first control unit, and keeping driving indication to the second inverter circuit of the second control unit ON continuously, when a failure occurs in a motor on the first inverter circuit side of the first control unit; and turning OFF the first power source relay circuit, the second power source relay circuit, and the fourth power source relay circuit, keeping the third power source relay circuit ON continuously, turning OFF driving indication to the second inverter circuit of the second control unit, and keeping driving indication to the first inverter circuit of the first control unit ON continuously, when a failure occurs in a motor on the second inverter circuit side of the second control unit.

Additionally, a method of controlling a vehicle electric braking device disclosed in the present application, includes the steps of: turning ON a first power source relay circuit and a second power source relay circuit, turning OFF a third power source relay circuit and a fourth power source relay circuit, feeding power from a first power source to a first control unit, feeding power from a second power source to a second control unit, and outputting driving indication of turning ON to a first inverter circuit of the first control unit and driving indication of turning ON to a second inverter circuit of the second control unit, when no failure occurs in a wheel brake; turning OFF the first power source relay circuit, the third power source relay circuit, and the fourth power source relay circuit, keeping the second power source relay circuit ON continuously, turning OFF driving indication to the first inverter circuit of the first control unit, and keeping driving indication to the second inverter circuit of the second control unit ON continuously, when a failure occurs in the first inverter circuit of the first control unit; turning OFF the second power source relay circuit, the third power source relay circuit, and the fourth power source relay circuit, keeping the first power source relay circuit ON continuously, turning OFF driving indication to the second inverter circuit of the second control unit, and keeping driving indication to the first inverter circuit of the first control unit ON continuously, when a failure occurs in the second inverter circuit of the second control unit; turning OFF the first power source relay circuit, the third power source relay circuit, and the fourth power source relay circuit, keeping the second power source relay circuit ON continuously, turning OFF driving indication to the first inverter circuit of the first control unit, and keeping driving indication to the second inverter circuit of the second control unit ON continuously, when a failure occurs in a motor on the first inverter circuit side of the first control unit; and turning OFF the second power source relay circuit, the third power source relay circuit, and the fourth power source relay circuit, keeping the first power source relay circuit ON continuously, turning OFF driving indication to the second inverter circuit of the second control unit, and keeping driving indication to the first inverter circuit of the first control unit ON continuously, when a failure occurs in a motor on the second inverter circuit side of the second control unit.

In addition, a method of controlling a vehicle electric braking device disclosed in the present application, includes the steps of: turning ON a first power source relay circuit, a second power source relay circuit, a third power source relay circuit, and a fourth power source relay circuit, feeding power from a third power source to a first control unit, a second control unit, the third power source relay circuit, and the fourth power source relay circuit, and outputting driving indication of turning ON to a first inverter circuit of the first control unit and driving indication of turning ON to a second inverter circuit of the second control unit, when no failure occurs in a wheel brake; turning OFF the first power source relay circuit and the third power source relay circuit, keeping the second power source relay circuit and the fourth power source relay circuit ON continuously, turning OFF driving indication to the first inverter circuit of the first control unit, and keeping driving indication to the second inverter circuit of the second control unit ON continuously, when a failure occurs in the first inverter circuit of the first control unit; turning OFF the second power source relay circuit and the fourth power source relay circuit, keeping the first power source relay circuit and the third power source relay circuit ON continuously, turning OFF driving indication to the second inverter circuit of the second control unit, and keeping driving indication to the first inverter circuit of the first control unit ON continuously, when a failure occurs in the second inverter circuit of the second control unit; turning OFF the first power source relay circuit and the third power source relay circuit, keeping the second power source relay circuit and the fourth power source relay circuit ON continuously, turning OFF driving indication to the first inverter circuit of the first control unit, and keeping driving indication to the second inverter circuit of the second control unit ON continuously, when a failure occurs in a motor on the first inverter circuit side of the first control unit; and turning OFF the second power source relay circuit and the fourth power source relay circuit, keeping the first power source relay circuit and the third power source relay circuit ON continuously, turning OFF driving indication to the second inverter circuit of the second control unit, and keeping driving indication to the first inverter circuit of the first control unit ON continuously, when a failure occurs in a motor on the second inverter circuit side of the second control unit.

Advantageous Effect of the Invention

According to a vehicle electric braking device and a method of controlling the same, disclosed in the present application, there can be obtained a vehicle electric braking device and a method of controlling the same, which can safely stop a vehicle even when a failure occurs in a component related to the vehicle electric braking device.

BRIEF DESCRIPTION OF THE DRAWINGS

FIG. 14 is a control table for explaining a method of controlling a wheel brake in a vehicle electric braking device according to Embodiment 3;

FIG. 15 is a control table for explaining a method of controlling a wheel brake in a vehicle electric braking device according to Embodiment 4;

FIG. 16 is a control table for explaining a method of controlling a wheel brake in a vehicle electric braking device according to Embodiment 5.

MODE FOR CARRYING OUT THE INVENTION

Embodiment 1

Figure 1:
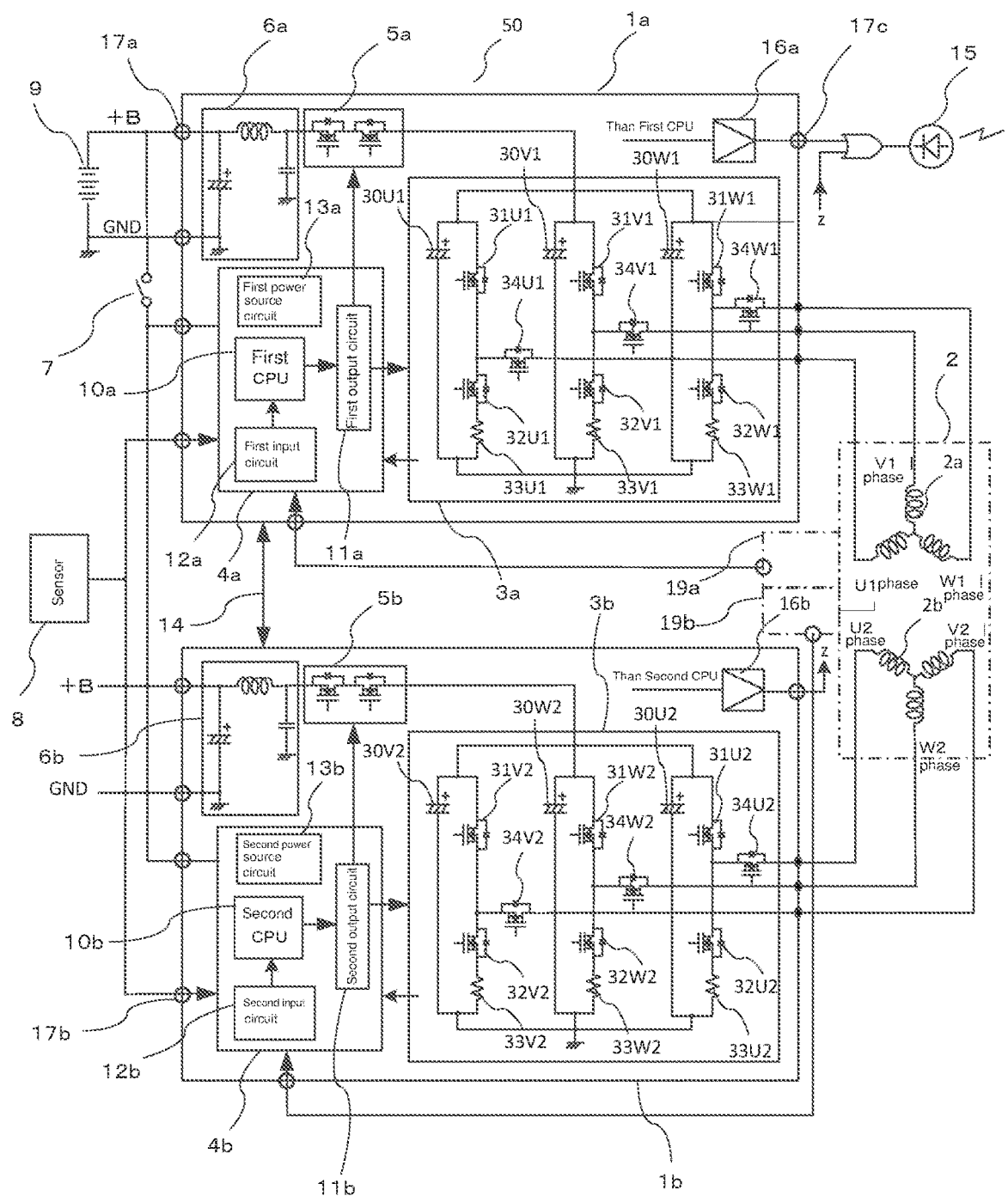
FIG. 1 is a circuit diagram showing a wheel brake in a vehicle electric braking device according to Embodiment 1.
Figure 2:
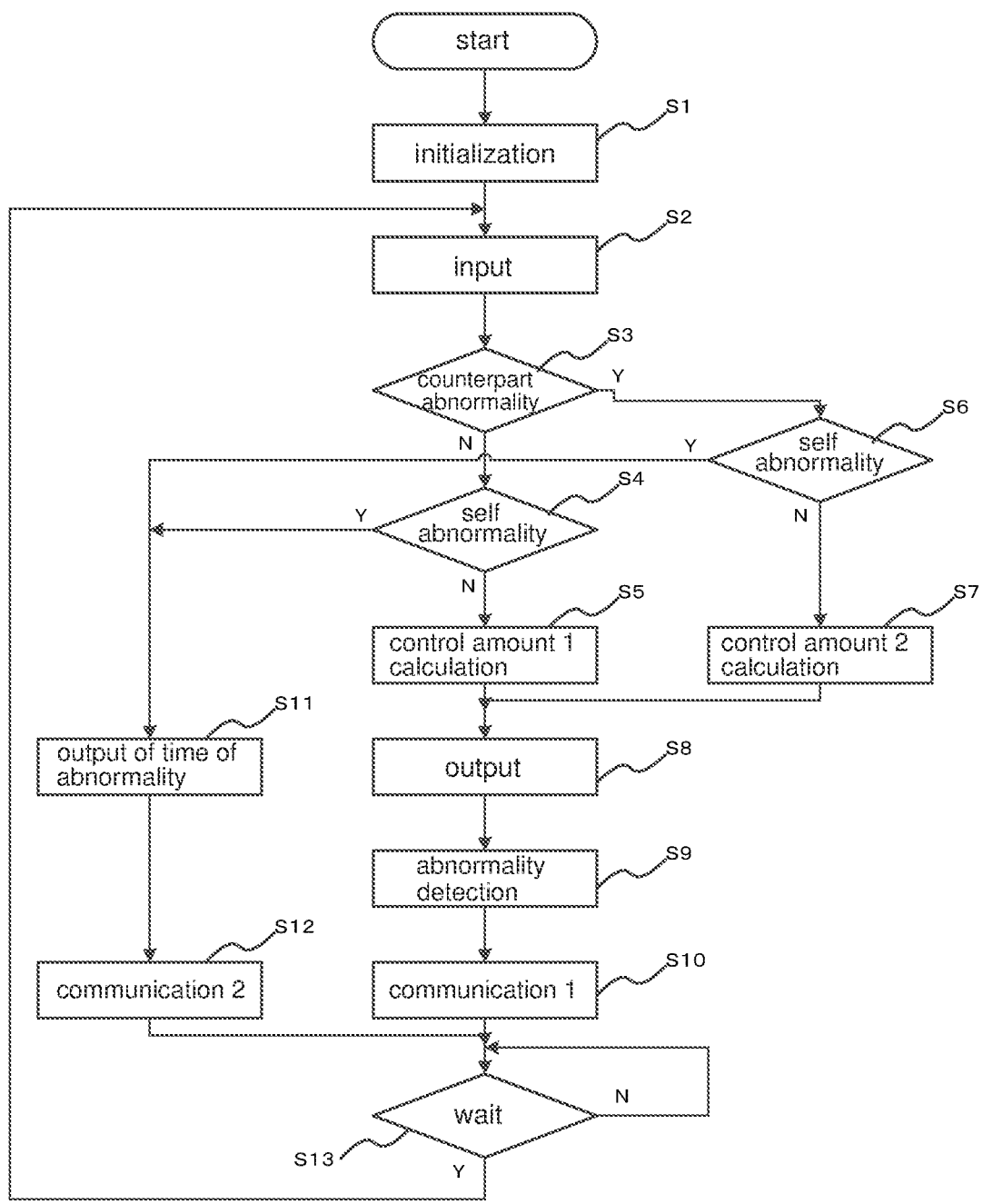
FIG. 2 is a flow chart for explaining a method of controlling the wheel brake in the vehicle electric braking device according to Embodiment 1.
Figure 3:
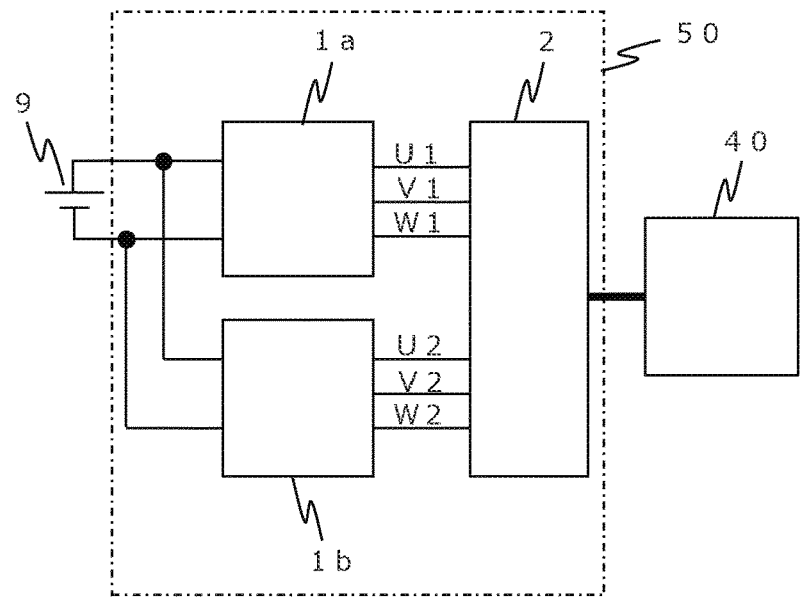
FIG. 3 is a circuit diagram showing a state where the wheel brake is connected to a brake mechanism and a battery in the electric braking device according to Embodiment 1.
Figure 4:
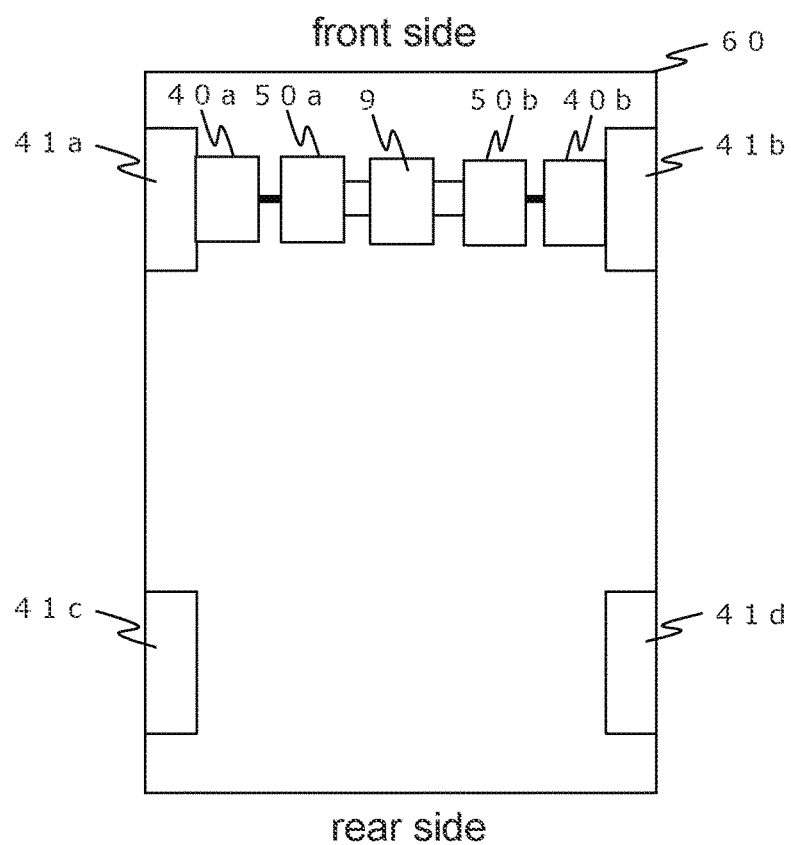
FIG. 4 is a block diagram showing the vehicle electric braking device according to Embodiment 1.
Figure 5:
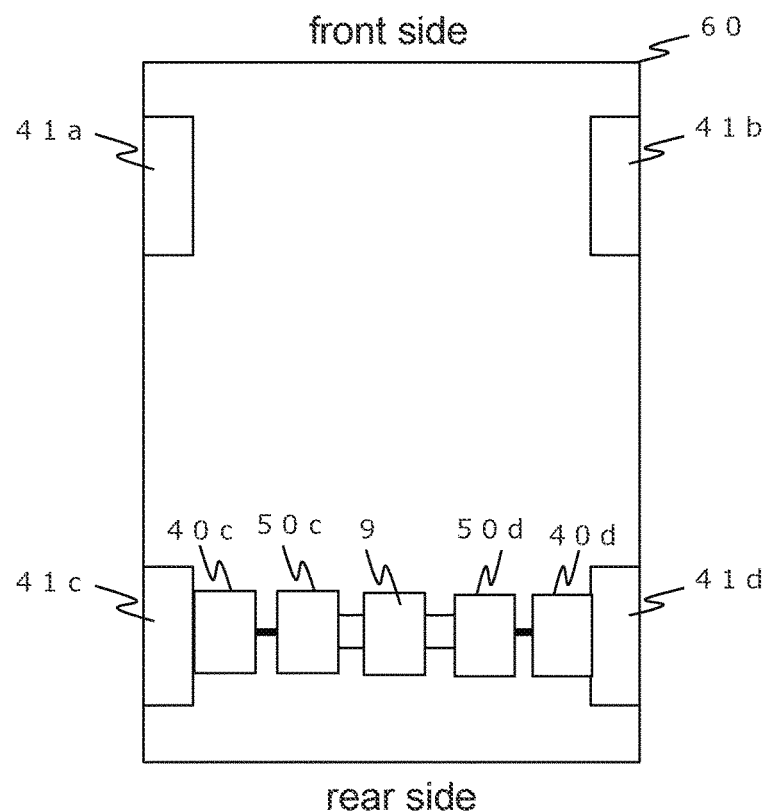
FIG. 5 is a block diagram showing other example of the vehicle electric braking device according to Embodiment 1.
Figure 6:
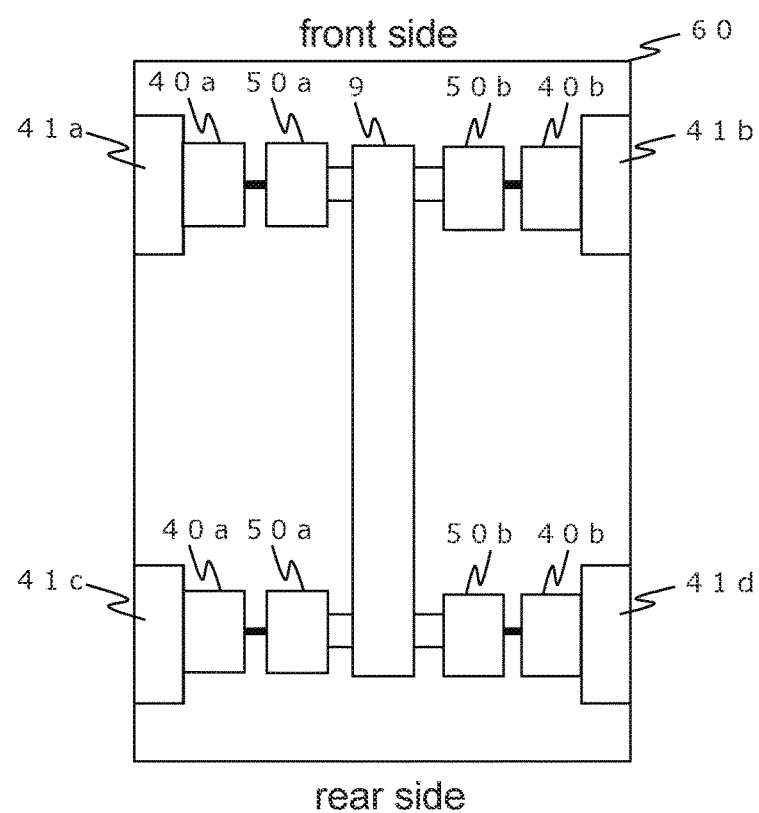
FIG. 6 is a block diagram showing other example of the vehicle electric braking device according to Embodiment 1.
Figure 7:
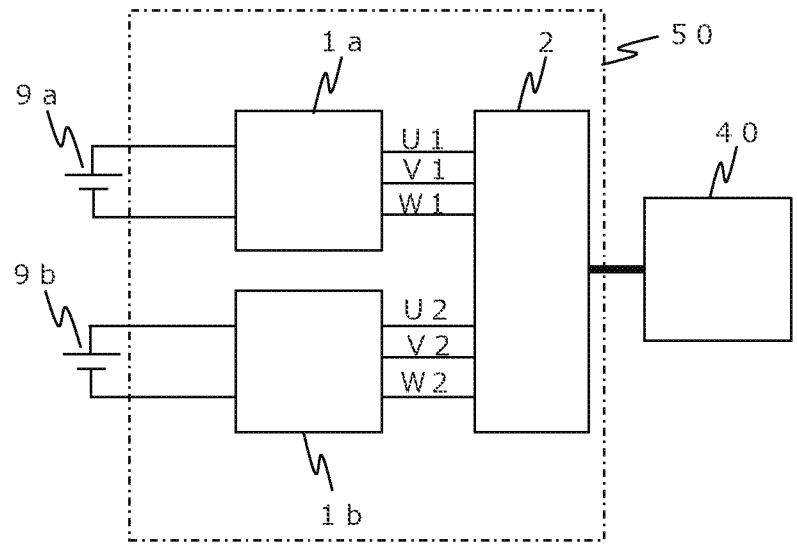
FIG. 7 is a circuit diagram showing other example of a state where a wheel brake is connected to a brake mechanism and batteries in the vehicle electric braking device according to Embodiment 1.
Figure 8:
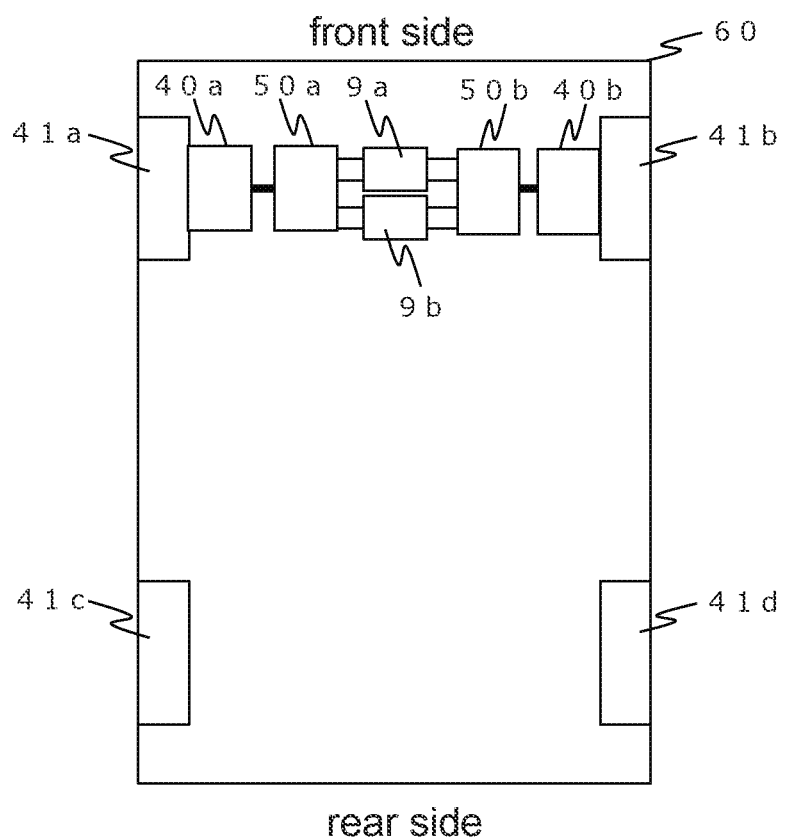
FIG. 8 is a block diagram showing other example of the vehicle electric braking device according to Embodiment 1.

Hereinafter, Embodiment 1 will be described on the basis of FIG. 1 to FIG. 8. Then, in each of the drawings, identical or equivalent members and portions will be described with the same reference numerals (and letters) assigned thereto. FIG. 1 is a circuit diagram showing a wheel brake in a vehicle electric braking device according to Embodiment 1. FIG. 2 is a flow chart for explaining a method of controlling the wheel brake in the vehicle electric braking device according to Embodiment 1. FIG. 3 is a circuit diagram showing a state where the wheel brake is connected to a brake mechanism and a battery in the vehicle electric braking device according to Embodiment 1. FIG. 4 is a block diagram showing the vehicle electric braking device according to Embodiment 1. FIG. 5 is a block diagram showing other example of the vehicle electric braking device according to Embodiment 1. FIG. 6 is a block diagram showing other example of the vehicle electric braking device according to Embodiment 1. FIG. 7 is a circuit diagram showing other example of a state where a wheel brake is connected to a brake mechanism and batteries in the vehicle electric braking device according to Embodiment 1. FIG. 8 is a block diagram showing other example of the vehicle electric braking device according to Embodiment 1.

In FIG. 1, a motor 2 is equipped with two sets of independent three phase coil windings, a first coil winding 2*a* and a second coil winding 2*b*, with respect to a single unit rotor (not shown in the drawing). A first control unit 1*a* performs driving control of the first coil winding 2*a* of the motor 2 and a second control unit 1*b* performs driving control of the second coil winding 2*b* of the motor 2, thereby operating a brake actuator. The first control unit 1*a* includes: a first inverter circuit 3*a*, a first control circuit section 4*a* on which a first central processing unit (hereinafter, referred to as "first CPU") 10*a* is mounted, a first power source relay switching element 5*a* that forms a first power source relay circuit, and the like. The second control unit 1*b* includes: a second inverter circuit 3*b*, a second control circuit section 4*b* on which a second central processing unit (hereinafter, referred to as "second CPU") 10*b* is mounted, a second power source relay switching element 5*b* that forms a second power source relay circuit, and the like.

Furthermore, through an ignition switch 7 from a battery 9 serving as a power source mounted on the vehicle, the power source is fed to the first control circuit section 4*a* via a first power source circuit 13*a* and the power source is fed to the second control circuit section 4*b* via a second power source circuit 13*b*.

Moreover, information such as a load sensor which is mounted in the vicinity of the brake actuator and detects pressing force of the brake actuator, a speed sensor that detects vehicle running speed, and the like is inputted from a sensor 8 to the first control circuit section 4*a* and the second control circuit section 4*b*. Incidentally, a large number of terminals, 17*a*, 17*b*, 17*c*, which are for connecting to external devices are provided on the first control unit 1*a* and the second control unit 1*b* and, specifically, such terminals are arranged by fixing connectors to circuit boards.

The information from the sensor 8 is transmitted to the first CPU 10*a* via a first input circuit 12*a* of the first control circuit section 4*a* and to the second CPU 10*b* via a second input circuit 12*b* of the second control circuit section 4*b*. The first CPU 10*a* calculates a current value which is for rotating the motor 2 on the basis of the inputted information and outputs a control signal to a first output circuit 11*a*; and the second CPU 10*b* calculates a current value which is for rotating the motor 2 on the basis of the inputted information and outputs a control signal to a second output circuit 11*b*. The first output circuit 11*a* receives an input signal and outputs a control signal that controls the respective switching elements of the first inverter circuit 3*a* that constitutes an output circuit; and the second output circuit 11*b* receives an input signal and outputs a control signal that controls the respective switching elements of the second inverter circuit 3*b* that constitutes an output circuit.

Incidentally, since only a small current flows in the first output circuit 11*a* and the second output circuit 11*b*, the first output circuit 11*a* is arranged in the first control circuit section 4*a* and the second output circuit 11*b* is arranged in the second control circuit section 4*b*; however, the first output circuit 11*a* may be arranged in the first inverter circuit 3*a* and the second output circuit 11*b* may be arranged in the second inverter circuit 3*b*.

Furthermore, a configuration is made such that the first inverter circuit 3*a* and the second inverter circuit 3*b* have the same circuit configuration with respect to respective phases (U1, V1, W1) of the first coil winding 2*a* of the motor 2 and respective phases (U2, V2, W2) of the second coil winding 2*b* of the motor 2 and current is independently supplied to the respective phases of the first coil winding 2*a* and the respective phases of the second coil winding 2*b*.

The first inverter circuit 3*a* is provided with: first upper arm switching elements (31U1, 31V1, 31W1) and first lower arm switching elements (32U1, 32V1, 32W1), which supply an output current to the three phase first coil winding 2*a* (U1, V1, W1) of the motor 2; first motor relay switching elements 34U1, 34V1, 34W1 which are connected to or disconnected from wiring with the respective phases U1, V1, W1 of the first coil winding 2*a* of the motor 2; first shunt resistors 33U1, 33V1, 33W1 for current detection; and first noise suppression capacitors 30U1, 30V1, 30W1.

The second inverter circuit 3*b* is provided with: second upper arm switching elements (31U2, 31V2, 31W2) and second lower arm switching elements (32U2, 32V2, 32W2), which supply an output current to the three phase second coil winding 2*b* (U2, V2, W2) of the motor 2; second motor relay switching elements 34U2, 34V2, 34W2 which are connected to or disconnected from wiring with the respective phases U2, V2, W2 of the second coil winding 2*b* of the motor 2;

second shunt resistors 33U2, 33V2, 33W2 for current detection; and second noise suppression capacitors 30U2, 30V2, 30W2.

Furthermore, a potential difference across terminals of the first shunt resistors 33U1, 33V1, 33W1 and, for example, a terminal voltage of the first coil winding 2a of the motor 2 are also inputted to the first input circuit 12a; and a potential difference across terminals of the second shunt resistors 33U2, 33V2, 33W2 and, for example, a terminal voltage of the second coil winding 2b of the motor 2 are also inputted to the second input circuit 12b. A configuration is made such that these kinds of information are also inputted to the first CPU 10a and the second CPU 10b, a difference from a detected value corresponding to a calculated current value is calculated, and a so-called feedback control is performed, whereby a necessary motor current is supplied to drive the brake actuator.

Incidentally, a control signal of the first power source relay switching element 5a is also outputted and current supply to the first coil winding 2a of the motor 2 can be interrupted by the first power source relay switching element 5a; and a control signal of the second power source relay switching element 5b is also outputted and current supply to the second coil winding 2b of the motor 2 can be interrupted by the second power source relay switching element 5b. In the same way, the first motor relay switching elements 34U1, 34V1, 34W1 can also independently interrupt current supply to the first coil winding 2a of the motor 2; and the second motor relay switching elements 34U2, 34V2, 34W2 can also independently interrupt current supply to the second coil winding 2b of the motor 2.

Here, a first filter 6a constituted of a capacitor and a coil is connected to power source terminals (+B, GND) of the battery 9 to suppress noise emission due to pulse width modulation of the first inverter circuit 3a; and a second filter 6b constituted of a capacitor and a coil is connected to the power source terminals (+B, GND) of the battery 9 to suppress noise emission due to pulse width modulation of the second inverter circuit 3b. Furthermore, since heat is generated by a large current that flows in the first power source relay switching element 5a and the second power source relay switching element 5b, a configuration may be such that the first power source relay switching element 5a is incorporated in the first inverter circuit 3a so as to be coupled to a heat dissipation body of the first inverter circuit 3a and the second power source relay switching element 5b is incorporated in the second inverter circuit 3b so as to be coupled to a heat dissipation body of the second inverter circuit 3b, whereby the heat is dissipated.

By the way, the first CPU 10a is equipped with an abnormality detection means that detects an abnormality of the first inverter circuit 3a, the first coil winding 2a (U1, V1, W1) of the motor 2, and the like from the inputted various kinds of information; and the second CPU 10b is equipped with an abnormality detection means that detects an abnormality of the second inverter circuit 3b, the second coil winding 2b (U2, V2, W2) of the motor 2, and the like from the inputted various kinds of information. Then, when an abnormality is detected, the first power source relay switching element 5a or the second power source relay switching element 5b is turned OFF and the battery 9 is cut OFF according to the abnormality. Alternatively, only a predetermined phase of the first motor relay switching elements 34U1, 34V1, 34W1 and the second motor relay switching elements 34U2, 34V2, 34W2 is turned OFF and the current supply can be interrupted. Moreover, a configuration is made such that when an abnormality is detected, the first CPU 10a and the second CPU 10b feed power to a notification device 15 such as a lamp via the first driving circuit 16a and the second driving circuit 16b, respectively, thereby activating the notification device 15.

Meanwhile, the motor 2 is a brushless motor in which two sets of three phase coil windings, the first coil winding 2a and the second coil winding 2b, are each star-connected and on which a first rotation sensor 19a and a second rotation sensor 19b which are for detecting the rotation position of the rotor are mounted. Two sets of sensors (not shown in the drawing) are mounted on each of the first rotation sensor 19a and the second rotation sensor 19b in order to secure each redundant system; and rotation information of the rotor is transmitted to each of the first input circuit 12a of the first control circuit section 4a and the second input circuit 12b of the second control circuit section 4b.

Incidentally, the motor 2 may be a delta-connected brushless motor or two bipolar pairs of brushed motors rather than the three-phase star-connected brushless motor. Furthermore, specifications of coil winding may be a distributed winding or a concentrated winding. However, it is necessary to configure so that the desired number of rotation of the motor and torque can be outputted even only one set of coil windings or two sets of coil windings.

As an example, as shown in FIG. 3, the motor 2 that constitutes a wheel brake 50 is connected to a brake mechanism 40 and has a role to brake the vehicle. Specifically, a configuration is made such that material subjected to friction (not shown in the drawing) rotated together with wheels (not shown in the drawing) mounted on the vehicle and friction material (not shown in the drawing) which moves by power of the motor 2 are equipped and vehicle braking force is obtained by pressing the friction material to the material subjected to friction.

As described above, the first control unit 1a and the second control unit 1b which constitute the wheel brake 50 are configured so as to be able to independently drive the motor 2 by independently using input information, calculated values, and detected values.

Furthermore, a communication line 14 is connected between the first CPU 10a and the second CPU 10b so as to be able to transfer data and information. Each of operation states of the counterpart first CPU 10a and the second CPU 10b can be grasped by transferring the information by means of the communication line 14. For example, matters in which the first CPU 10a detects an abnormality and turns OFF a predetermined switching element can be transmitted to the second CPU 10b. If an abnormality occurs in the first CPU 10a itself or the second CPU 10b itself, a regular communication signal by a predetermined format cannot be transferred, whereby one side CPU can also grasp the occurrence of an abnormality of the other side CPU.

Next, a control method in the above circuit configuration and motor construction will be described.

Since control of each circuit is almost processed in accordance with a program of the first CPU 10a or that of the second CPU 10b, a description will be given according to a flow chart shown in FIG. 2. Incidentally, the first CPU 10a and the second CPU 10b perform substantially the same process. First, a description will be given on one side first CPU 10a.

First, when the ignition switch 7 is switched, a current is supplied to the first CPU 10a through the first power source circuit 13a and the process is started.

In Step S1, a random access memory (RAM), a read only memory (ROM), a port, and the like are initialized. Next, in Step S2, all kinds of information inputted via the first input circuit 12a are acquired and stored. Communication data of a counterpart second CPU 10b is also included in this information.

In Step S3, the presence or absence of abnormality detection in the counterpart second CPU 10b is checked. The presence or absence of the counterpart abnormality can be determined by deciphering communication data with the counterpart second CPU 10b. When no abnormality occurs (N:No) in the counterpart second CPU 10b, the presence or absence of an abnormality in a self first CPU 10a is checked in Step S4. Here, when an abnormality is not detected (N), the process is advanced to Step S5 and a normal control amount 1 in which no abnormality occurs in both of the first CPU 10a and the second CPU 10b is calculated.

Meanwhile, in Step S3, when an abnormality occurs (Y: Yes) in the counterpart second CPU 10b, the process is advanced to Step S6 and the presence or absence of an abnormality in the self first CPU 10a is checked in the same way as in Step S4. Here, when an abnormality occurs (Y) in the self first CPU 10a, the process is advanced to Step S11 and processing at the time of self abnormality is performed. When there is no abnormality (N) in the self first CPU 10a, the process is advanced to Step S7 and control amounts 2 under a condition of abnormality of the counterpart second CPU 10b and a condition of normality of the self first CPU 10a are calculated. Subsequently, the process is advanced to Step S8.

Next, in Step S4 or Step S6, when it is determined that an abnormality occurs in the first CPU 10a itself, the process is advanced to Step S11 and a control signal is outputted so as to stop output to the first output circuit 11a. Incidentally, the control signal may be classified into a plurality of levels on the basis of the occurred abnormality. For example, in the case of a ground short or a voltage short of the coil windings 2a, 2b, or the switching elements of the first inverter circuit 3a and the second inverter circuit 3b, a control signal is outputted so as to turn OFF all the switching elements including the first power source relay switching element 5a.

Furthermore, when an open circuit failure occurs in one of the first upper arm switching elements (31U1, 31V1, 31W1) and the first lower arm switching elements (32U1, 32V1, 32W1) of the first inverter circuit 3a, or in the first motor relay switching elements 34U1, 34V1, 34W1, it is also possible to stop driving of the switching element of only a phase where the abnormality occurs and to output a control command to the other phases as normal. Alternatively, when an open circuit failure occurs in one of the second upper arm switching elements (31U2, 31V2, 31W2) and the second lower arm switching elements (32U2, 32V2, 32W2) of the second inverter circuit 3b, or in the second motor relay switching elements 34U2, 34V2, 34W2, it is also possible to stop driving of the switching element of only a phase where the abnormality occurs and to output a control command to the other phases as normal. Because of this, in Step S11, a setting can be performed so that a part of control can be processed continuously except for processing at the time of abnormality where all the phases are in a stopped state. Incidentally, when two-phase driving can be performed as described above, calculation processing of the control amount is also necessary and thus it may be more efficient to be processed in Steps S5, S7.

Next, in Step S12, data in an abnormal state is transmitted by means of the communication line 14. This data is transmitted, also including an abnormality level, for example, matters that all the switching elements are in an OFF state. Furthermore, in a state where only a certain phase is turned OFF, transmission can be made, also including ratio or the like in which a control amount in this case is compared to that in normal time; however, communication of this kind of abnormality contents can also be processed through Step S9 and Step S10. This allows the counterpart second CPU 10b to grasp even the abnormality contents. Consequently, a control amount of the self first CPU 10a can be corrected and outputted according to the abnormality of the counterpart second CPU 10b.

Next, in Step S5, a description will be given on a method of calculating a control amount in normal time when no abnormality occurs in both of the first control unit 1a and the second control unit 1b.

In Step S5, a current value required according to conditions of required pressing force, vehicle speed, or the like is calculated and this is divided into one half. This halved current value is the control amount allocated to one side control unit. Moreover, a current being supplied at present is detected from a potential difference across each of the first shunt resistors 33U1, 33V1, 33W1 and is outputted as a control command value according to the difference between a target value and the detected value.

Meanwhile, in Step S7, an abnormality occurs in the counterpart system; thus, a current value required for only the self system needs to be calculated and supplied as the control amount 2. Alternatively, if only one-phase is abnormal and two-phase driving is performed in the counterpart system, a calculation is made so as to supply two-thirds the current value, and a control command value thus calculated is outputted. Furthermore, when the counterpart system is in a state where the motor cannot be driven at all, all the calculated control amount is controlled so as to output in the self system. Moreover, when an abnormality occurs in only on phase as previously described, a control amount for two-phase driving can be calculated in Step S5 or Step S7. More specifically, the control amount can be calculated by calculating in almost the same procedure as that in normal time and, finally, by correcting for two-phase driving. Additionally, the process can be executed in the same procedure by changing only a distribution rate in the first CPU 10a and the second CPU 10b, whereby simplification of control logic can be achieved.

Next, in Step S8, a control command is outputted so as to be able to drive the respective switching elements on the basis of the control command value. The upper and lower arm switching elements of the first inverter circuit 3a and the second inverter circuit 3b are pulse-width modulated and thus their corresponding control signals are outputted.

In Step S9, the presence or absence of an abnormality is checked. Specifically, an abnormality can be detected by a method in which current flowing to drive each switching element is detected by the first shunt resistors 33U1, 33V1, 33W1 and the second shunt resistors 33U2, 33V2, 33W2, and by monitoring a coil winding terminal voltage of the motor and distinguishing that a predetermined voltage appears according to the driving of the switching elements.

Moreover, when a difference from the detected current value with respect to the target current value does not come close even after a predetermined time elapses, there is a possibility of a leak and thus it can also be determined as an abnormality.

As described above, voltage and current of each portion are monitored to detect an abnormality, whereby an abnormality can be detected even in only one phase.

When the first CPU 10a detects this kind of abnormality, the first CPU 10a stores, also including an abnormal state and communicates the abnormal state to the counterpart second CPU 10b via the communication line 14 in Step S10.

If there is other necessary information, it is efficient when such kind of information is transmitted being included in this process. For example, the accuracy of calculation of each other's control amount can also be checked by transferring information of the first input circuit 12a and information of the control amount.

Next, in Step S13, the process waits until a predetermined time, for example, 5 msec elapses, and if the predetermined time elapses (Y), the process is returned to Step S2 and the process is advanced by repeating in the same procedure again.

Although a description will be omitted, the above-described processing operation of the first CPU 10a is also executed by the second CPU 10b in the same way, thereby forming a double redundant system.

Next, a description will be made on the second CPU 10b. First, when an ignition switch 7 is switched, a current is supplied to the second CPU 10b through the second power source circuit 13b and the process is started.

In Step S1, a RAM, a ROM, a port, and the like are initialized. Next, in Step S2, all kinds of information inputted via the second input circuit 12b are acquired and stored. Communication data of a counterpart first CPU 10a is also included in this information.

In Step S3, the presence or absence of abnormality detection in the counterpart first CPU 10a is checked. The presence or absence of the counterpart abnormality can be determined by deciphering communication data with the counterpart first CPU 10a. When no abnormality occurs (N:No) in the counterpart first CPU 10a, the presence or absence of an abnormality in a self second CPU 10b is checked in Step S4. Here, when an abnormality is not detected (N), the process is advanced to Step S5 and a normal control amount 1 in which no abnormality occurs in both of the first CPU 10a and the second CPU 10b is calculated.

Meanwhile, in Step S3, when an abnormality occurs (Y:Yes) in the counterpart first CPU 10a, the process is advanced to Step S6 and the presence or absence of an abnormality in the self second CPU 10b is checked in the same way as in Step S4. Here, when an abnormality occurs (Y) in the self second CPU 10b, the process is advanced to Step S11 and processing at the time of self abnormality is performed. When there is no abnormality (N) in the self second CPU 10b, the process is advanced to Step S7 and control amounts 2 under a condition of abnormality of the counterpart first CPU 10a and a condition of normality of the self second CPU 10b are calculated. Subsequently, the process is advanced to Step S8.

Next, in Step S4 or Step S6, when it is determined that an abnormality occurs in the second CPU 10b itself, the process is advanced to Step S11 and a control signal is outputted so as to stop output to the second output circuit 11b. Incidentally, the control signal may be classified into a plurality of levels on the basis of the occurred abnormality. For example, in the case of a ground short or a voltage short of the first coil winding 2a and the second coil winding 2b, or the switching elements of the first inverter circuit 3a and the second inverter circuit 3b, a control signal is outputted so as to turn OFF all the switching elements including the second power source relay switching element b.

Furthermore, when an open circuit failure occurs in one of the second upper arm switching elements (31U2, 31V2, 31W2) and the second lower arm switching elements (32U2, 32V2, 32W2) of the second inverter circuit 3b, or in the second motor relay switching elements 34U2, 34V2, 34W2, it is also possible to stop driving of the switching element of only a phase where the abnormality occurs and to output a control command to the other phases as normal. Alternatively, when an open circuit failure occurs in one of the first upper arm switching elements (31U1, 31V1, 31W1) and the first lower arm switching elements (32U1, 32V1, 32W1) of the first inverter circuit 3a, or in the first motor relay switching elements 34U1, 34V1, 34W1, it is also possible to stop driving of the switching element of only a phase where the abnormality occurs and to output a control command to the other phases as normal. Because of this, in Step S11, a setting can be performed so that a part of control can be processed continuously except for processing at the time of abnormality where all the phases are in a stopped state. Incidentally, when two-phase driving can be performed as described above, calculation processing of the control amount is also necessary and thus it may be more efficient to be processed in Steps S5, S7.

Next, in Step S12, data in an abnormal state is transmitted by means of the communication line 14. This data is transmitted, also including an abnormality level, for example, matters that all the switching elements are in an OFF state. Furthermore, in a state where only a certain phase is turned OFF, transmission can be made, also including ratio or the like in which a control amount in this case is compared to that in normal time; however, communication of this kind of abnormality contents can also be processed through Step S9 and Step S10. This allows the counterpart first CPU 10a to grasp even the abnormality contents. Consequently, a control amount of the self second CPU 10b can be corrected and outputted according to the abnormality of the counterpart first CPU 10a.

Next, in Step S5, a description will be given on a method of calculating a control amount in normal time when no abnormality occurs in both of the first control unit 1a and the second control unit 1b.

In Step S5, a current value required according to conditions of required pressing force, vehicle speed, or the like is calculated and this is divided into one half. This halved current value is the control amount allocated to one side control unit. Moreover, a current being supplied at present is detected from a potential difference across each of the second shunt resistors 33U2, 33V2, 33W2 and is outputted as a control command value according to the difference between a target value and the detected value.

Meanwhile, in Step S7, an abnormality occurs in the counterpart system; thus, a current value required for only the self system needs to be calculated and supplied as the control amount 2. Alternatively, if only one-phase is abnormal and two-phase driving is performed in the counterpart system, a calculation is made so as to supply two-thirds the current value, and a control command value thus calculated is outputted. Furthermore, when the counterpart system is in a state where the motor cannot be driven at all, all the calculated control amount is controlled so as to output in the self system. Moreover, when an abnormality occurs in only on phase as previously described, a control amount for two-phase driving can be calculated in Step S5 or Step S7. More specifically, the control amount can be calculated by calculating in almost the same procedure as that in normal time and, finally, by correcting for two-phase driving. Additionally, the process can be executed in the same procedure by changing only a distribution rate in the first CPU 10a and the second CPU 10b, whereby simplification of control logic can be achieved.

Next, in Step S8, a control command is outputted so as to be able to drive the respective switching elements on the basis of the control command value. The upper and lower arm switching elements of the first inverter circuit 3a and the second inverter circuit 3b are pulse-width modulated and thus their corresponding control signals are outputted.

In Step S9, the presence or absence of an abnormality is checked. Specifically, an abnormality can be detected by a method in which current flowing to drive each switching element is detected by the first shunt resistors 33U1, 33V1, 33W1 and the second shunt resistors 33U2, 33V2, 33W2, and by monitoring a coil winding terminal voltage of the motor and distinguishing that a predetermined voltage appears according to the driving of the switching elements.

Moreover, when a difference from the detected current value with respect to the target current value does not come close even after a predetermined time elapses, there is a possibility of a leak and thus it can also be determined as an abnormality.

As described above, voltage and current of each portion are monitored to detect an abnormality, whereby an abnormality can be detected even in only one phase.

When the second CPU 10b detects this kind of abnormality, the second CPU 10b stores, also including an abnormal state and communicates the abnormal state to the counterpart first CPU 10a via the communication line 14 in Step S10. If there is other necessary information, it is efficient when such kind of information is transmitted being included in this process. For example, the accuracy of calculation of each other's control amount can also be checked by transferring information of the second input circuit 12b and information of the control amount.

Next, in Step S13, the process waits until a predetermined time, for example, 5 msec elapses, and if the predetermined time elapses (Y), the process is returned to Step S2 and the process is advanced by repeating in the same procedure again.

Consequently, in a normal state where there is no abnormality, each control unit is allocated one-half each and performs control of the motor 2; however, when an abnormality occurs in one side control unit, a power source relay connected to its system is turned OFF and a power source relay connected to a normal system is kept ON. Then, even in a worst case, a normal CPU can continue 100% control and does not fall into a situation where driving of a brake actuator becomes difficult.

Furthermore, there can be appended a function that notifies abnormality of not only the self system but also the counterpart system, notification to a driver in the occurrence of abnormality is assured, and the driver can also be informed of which side of the motor 2 is abnormal. This notification can be achieved by actuating the notification device 15 in Step S10 or Step S12 on the basis of output at the time of abnormality in Step S9 or Step S11.

Furthermore, even in normal time when no abnormality occurs, for example, when the temperature of one side control unit is higher than that of the other side control unit, uneven control such as one-third to two-thirds can also be performed. This kind of situation is enabled by transmitting information in which one side control unit asks for help to the other side control unit via the communication line 14 and notifying the counterpart control unit of the information. Moreover, when the self control unit is also exposed to a high temperature, both of the control units are in a high load state; thus, the occurrence of a failure can also be prevented by mutually reducing the target value.

Additionally, the sharing ratio of the control amount can be theoretically changed in any way; however, the ratio having only two or three stages is advantageous in light of simplification of control specifications, simplification of CPU programs, and measures at the time of abnormality of the CPU itself. For example, there can also be three-stages of level, with the normal side being 50%, 65%, 100%, and the abnormal side being 50%, 35%, 0%.

Incidentally, in the aforementioned embodiment, although Communication 1 in Step S10 and Communication 2 in Step S12 are independently provided in two places, this is because output systems are independently provided taking into consideration matters that an abnormality occurs; and Communication 1 and Communication 2 may be integrated into one place. Furthermore, an abnormality detection means of Step S9 is arranged after output Step S8; however, the abnormality detection means may be provided between, for example, Step S2 and Step S3.

Taking into consideration a case where, in particular, the switching elements in the first control unit 1a and the second control unit 1b are driven at 100%, their heat dissipation properties need to be sufficiently secured. Specifically, it is necessary to design taking into consideration a current capacity of the element itself and a heat sink structure for heat dissipation. Furthermore, also with regard to the motor 2, it is necessary to design specifications of coils and magnets and the scale of each component so that maximum torque with respect to the desired number of rotation can be outputted by only one set of three phase coil windings.

Furthermore, when one side control unit becomes abnormal and if a heat sink (not shown in the drawing) is a single unit, the entire heat sink can be used by only one system; thus, heat dissipation properties can be improved. Moreover, heat bias can be eliminated to form even heat distribution by this single unit heat sink (not shown in the drawing).

Moreover, various types of sensors are suitably mountable and are not limited to the sensor described in this embodiment. For example, it is not objectionable even if the first shunt resistor and the second shunt resistor are non-contact current sensors. Besides, the connector, the motor relay, the noise suppression capacitor, the filter, and the like are mounted; however, these may not be mounted or may be mounted by changing their configuration and similar effects can be obtained.

The wheel brake 50 shown in FIG. 3 is a piece of apparatus which brakes at least one of the wheels mounted on the vehicle. The vehicle electric braking device in Embodiment 1 of the present application is constituted of the combination of the battery 9, the brake mechanism 40, and the wheel brake 50 and is mounted on the vehicle.

The wheel brake 50 is constituted of: the motor 2 equipped with two sets of independent three phase coil windings, the first coil winding 2a and the second coil winding 2b, with respect to the single unit rotor (not shown in the drawing); the first control unit 1a which is connected to the first coil winding 2a of the motor 2 and controls the first coil winding 2a of the motor 2; and the second control unit 1b which is connected to the second coil winding 2b of the motor 2 and controls the second coil winding 2b of the motor 2. There is shown a case where the number of battery 9 serving as the power source is one and the battery 9 is connected to the first control unit 1a and the second control unit 1b; and the motor 2 is connected to the brake mechanism 40.

The first inverter circuit 3a of the first control unit 1a has three phase circuit configuration with respect to the respective phases (U1, V1, W1) of the first coil winding 2a of the motor 2 and is configured so as to independently supply a current to each phase of the first coil winding 2a. The second inverter circuit 3b of the second control unit 1b has three phase circuit configuration with respect to the respective phases (U2, V2, W2) of the second coil winding 2b of the motor 2 and is configured so as to independently supply a current to each phase of the second coil winding 2b.

Examples of the vehicle electric braking device in Embodiment 1 of the present application will be shown in FIG. 4 to FIG. 6. Reference numeral 60 denotes a vehicle in which four wheels 41a, 41b, 41c, 41d are mounted. Brake mechanisms 40a, 40b, 40c, 40d are mounted on the wheels 41a, 41b, 41c, 41d, respectively. Although details of the brake mechanisms 40a, 40b, 40c, 40d are not shown, the brake mechanism is not a mechanism related to electric braking that is a feature of the present application, but is a conventional hydraulic brake mechanism and drawing and description thereof will be omitted. Reference numerals 50a, 50b, 50c, 50d denote wheel brakes and are each connected to the battery 9.

A description will be given on the arrangement of the wheel brakes 50a to 50d. A configuration is made such that, in the example of FIG. 4, there is shown a case where the wheel brakes 50a, 50b are connected to two wheels on the front side 41a, 41b, respectively; in the example of FIG. 5, there is shown a case where the wheel brakes 50c, 50d are connected to two wheels on the rear side 41c, 41d, respectively; and in the example of FIG. 6, the wheel brakes 50a, 50b are connected to two wheels on the front side 41a, 41b, respectively, and the wheel brakes 50c, 50d are connected to two wheels on the rear side 41c, 4d, respectively, the wheel brakes 50a, 50b, 50c, 50d being connected to one battery 9.

The wheel brakes are mounted on a plurality of wheels, whereby the vehicle can be safely stopped, also in the occurrence of a failure. As an example, it is conceivable that a redundant wheel brake of the present application is connected to each of two wheels of four wheels and a wheel brake that is not made redundant, which is constituted of a three phase inverter and a three phase motor, is connected to each of the other two wheels. The vehicle can be safely stopped, also in the occurrence of a failure, by combining braking force in four wheels.

The wheel brake 50 shown in FIG. 7 shows a case where the number of batteries serving as a power source is two and shows a case where a first control unit 1a is connected to a first battery 9a and a second control unit 1b is connected to a second battery 9b. A configuration is made such that power is fed from the first battery 9a to the first control unit 1a and power is fed from the second battery 9b to the second control unit 1b. Not only the control unit but also the battery serving as the power source are made redundant, whereby safeness in the occurrence of a failure is further improved. FIG. 8 shows other example in which the wheel brakes 50a, 50b are mounted on the vehicle 60.

Here, although the power source is the battery, it may be configured such that this is a generator, or a DC/DC converter, or the combination thereof. If the power source is made redundant, similar effects can be obtained. In FIG. 8, the wheel brakes 50a, 50b are connected to two wheels on the front side 41a, 41b, respectively; however, it may be configured such that the wheel brakes 50c, 50d are mounted on two wheels on the rear side 41c, 41d, respectively; or the wheel brakes 50a, 50b are connected to two wheels on the front side 41a, 41b, respectively, and the wheel brakes 50c, 50d are connected to two wheels on the rear side 41c, 41d, respectively. The wheel brakes are mounted on a plurality of wheels, whereby the vehicle can be safely stopped, also in the occurrence of a failure.

Embodiment 2

Figure 9:
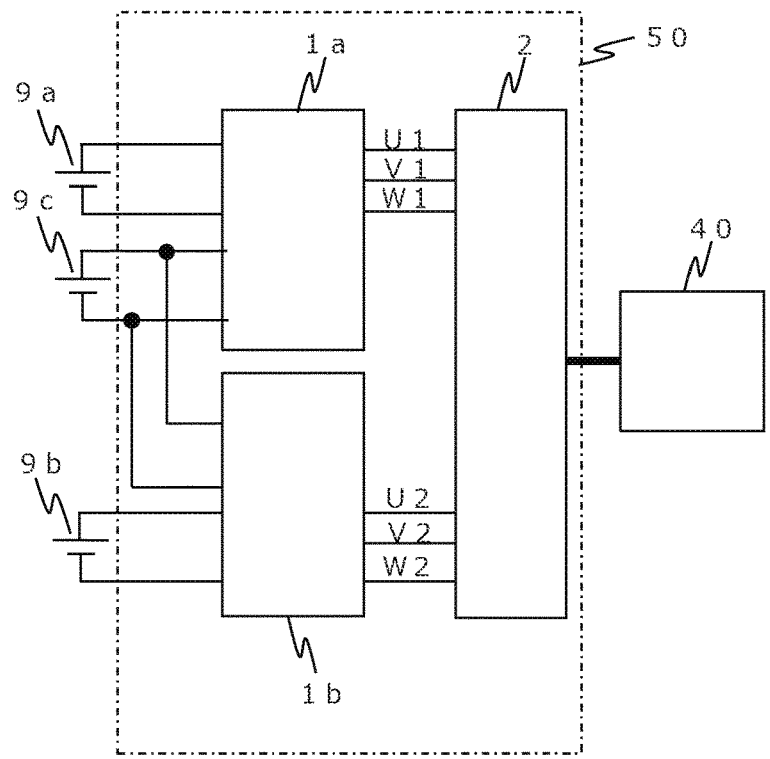
FIG. 9 is a circuit diagram showing a state where a wheel brake is connected to a brake mechanism and batteries in a vehicle electric braking device according to Embodiment 2.
Figure 10:
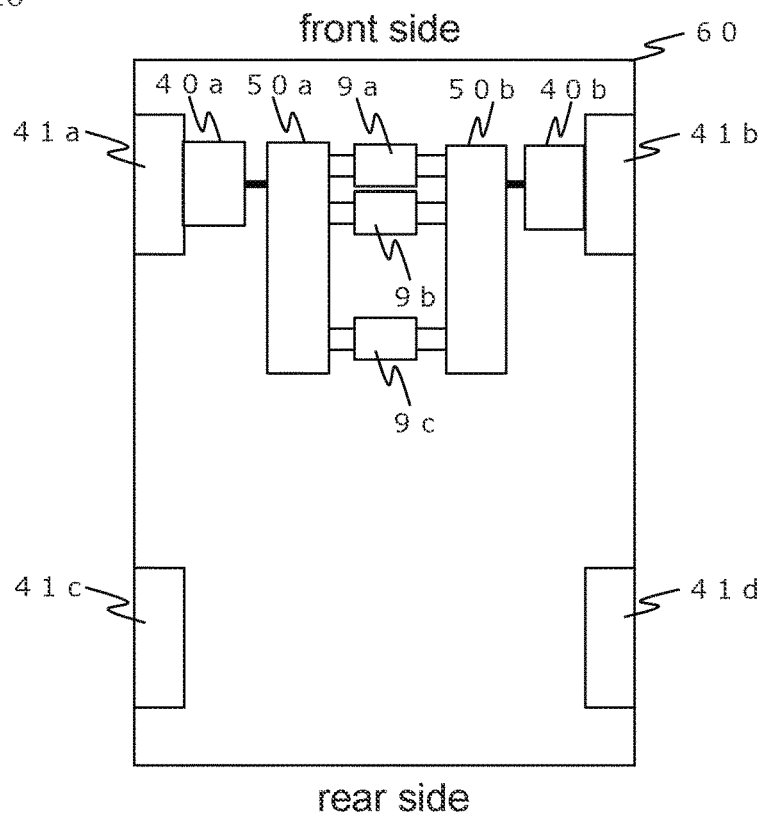
FIG. 10 is a block diagram showing the vehicle electric braking device according to Embodiment 2.
Figure 11:
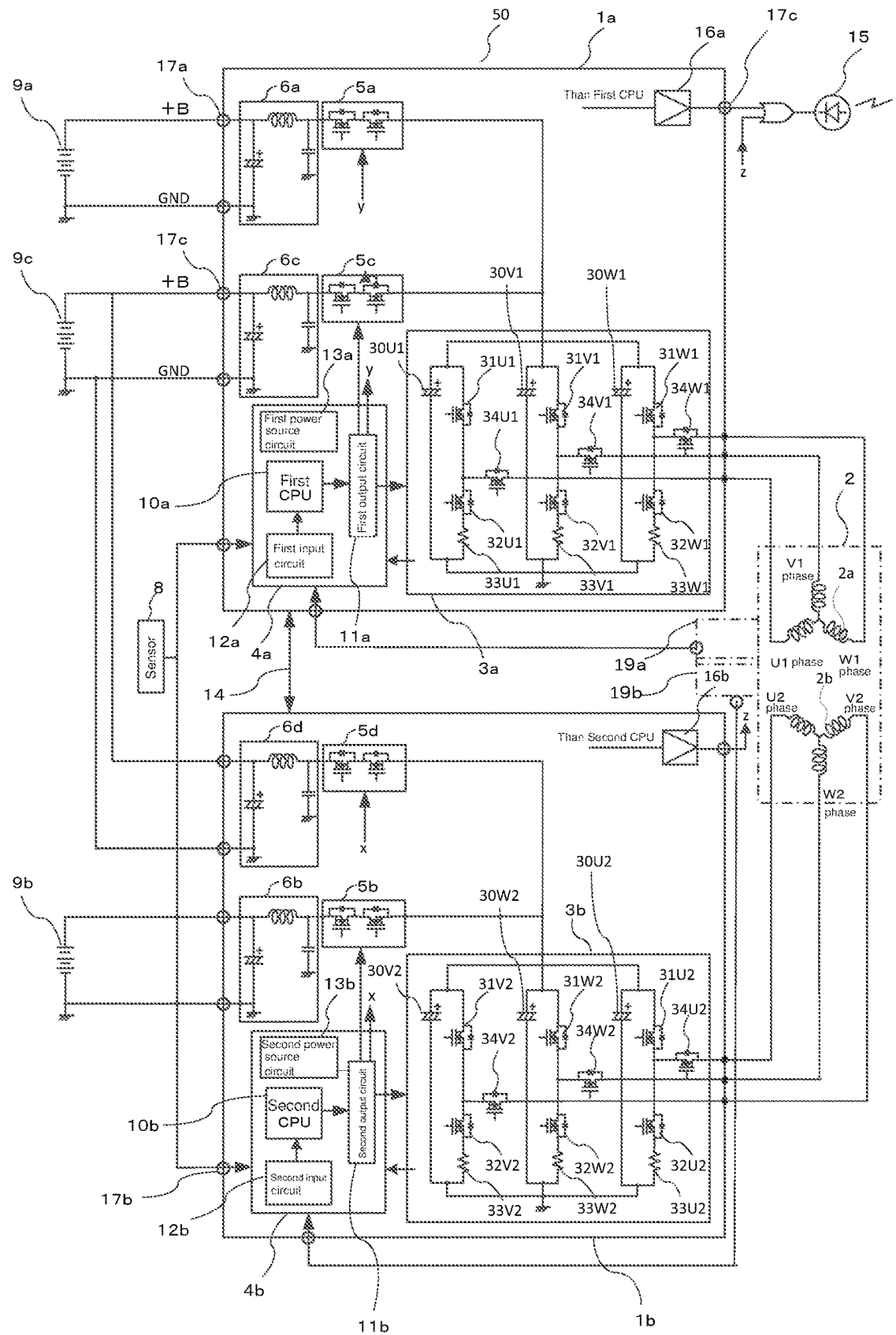
FIG. 11 is a circuit diagram showing the wheel brake in the vehicle electric braking device according to Embodiment 2.
Figure 12:
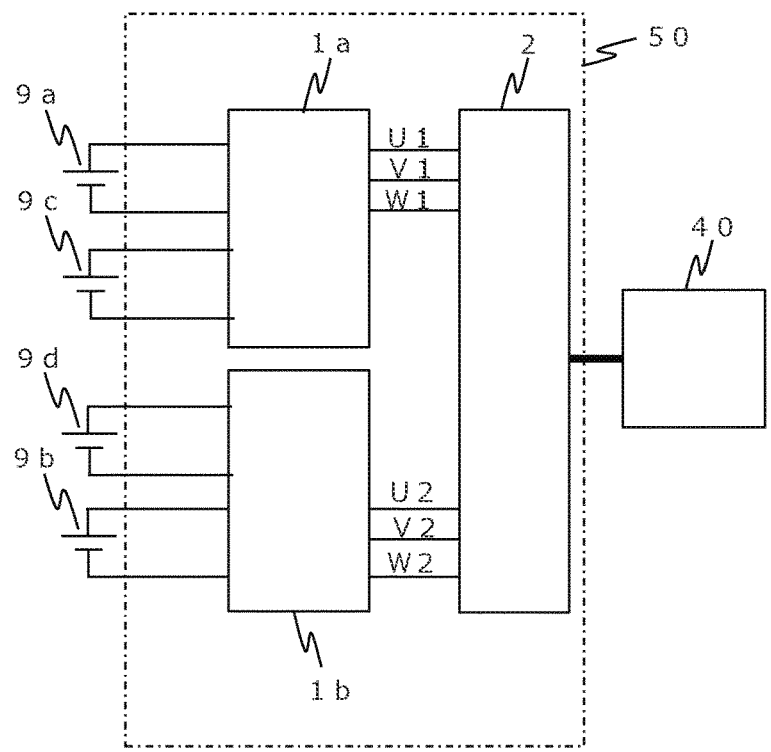
FIG. 12 is a circuit diagram showing other example of a state where a wheel brake is connected to a brake mechanism and batteries in the vehicle electric braking device according to Embodiment 2.
Figure 13:
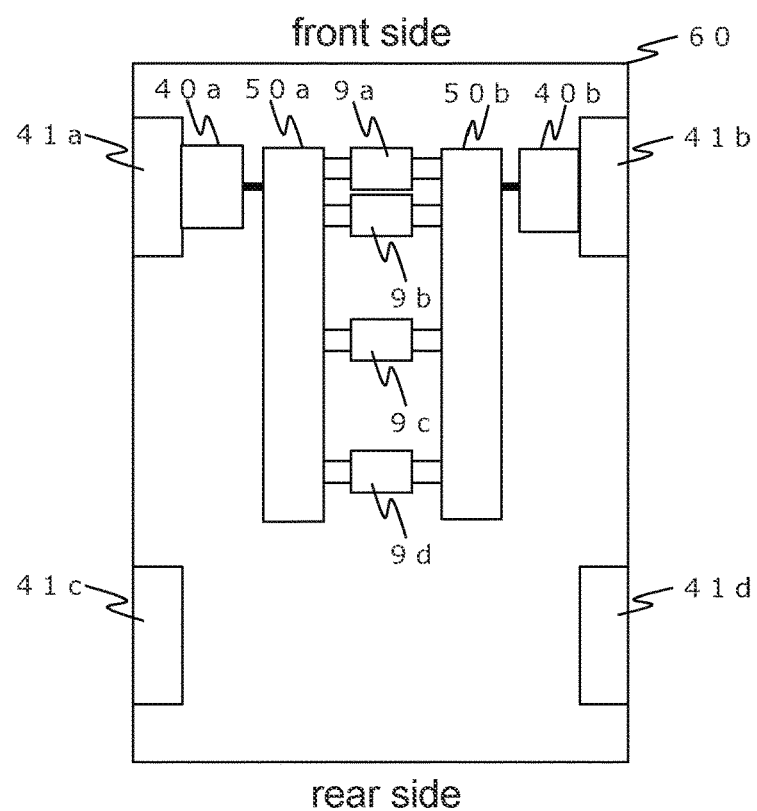
FIG. 13 is a block diagram showing other example of the vehicle electric braking device according to Embodiment 2.

Embodiment 2 will be described on the basis of FIG. 9 to FIG. 13. Then, in each of the drawings, identical or equivalent members and portions will be described with the same reference numerals (and letters) assigned thereto. FIG. 9 is a circuit diagram showing a state where a wheel brake is connected to a brake mechanism and batteries in a vehicle electric braking device according to Embodiment 2. FIG. 10 is a block diagram showing the vehicle electric braking device according to Embodiment 2. FIG. 11 is a circuit diagram showing the wheel brake in the vehicle electric braking device according to Embodiment 2. FIG. 12 is a circuit diagram showing other example of a state where a wheel brake is connected to a brake mechanism and batteries in the vehicle electric braking device according to Embodiment 2. FIG. 13 is a block diagram showing other example of the vehicle electric braking device according to Embodiment 2.

FIG. 11 is the circuit diagram showing an electric relevant part configuration of the wheel brake in the vehicle electric braking device. The circuit diagram is configured such that, in the configuration of FIG. 1 described in Embodiment 1, the battery 9 serving as the power source is changed to a battery 9a, a battery 9b, and a battery 9c; a third power source relay switching element 5c, which forms a third power source relay circuit between the battery 9c and the first inverter circuit 3a, is connected in parallel to the first power source relay switching element 5a; and a fourth power source relay switching element 5d, which forms a fourth power source relay circuit between the battery 9c and the second inverter circuit 3b, is connected in parallel to the second power source relay switching element 5b. Since other constituent components are similar to those described in FIG. 1 and the operation as the wheel brake is similar to those described in FIG. 2, the description thereof will be omitted.

A wheel brake 50 shown in FIG. 9 shows a case where a first control unit 1a is connected to the first battery 9a and the third battery 9c; and a second control unit 1b is connected to the second battery 9b and the third battery 9c. A configuration is made such that power is fed from the first battery 9a or the third battery 9c to the first control unit 1a and power is fed from the second battery 9b or the third battery 9c to the second control unit 1b. FIG. 10 shows other example of mounting on a vehicle and the aforementioned effects can be obtained.

Furthermore, a wheel brake 50 shown in FIG. 12 shows a case where a first control unit 1a is connected to the first battery 9a and the third battery 9c and a second control unit 1b is connected to the second battery 9b and a fourth battery 9d. A configuration is made such that power is fed from the first battery 9a or the third battery 9c to the first control unit 1a and power is fed from the second battery 9b or the fourth battery 9d to the second control unit 1b. FIG. 13 shows other example of mounting on a vehicle and the aforementioned effects can be obtained.

Here, although the power source is the battery, it may be configured such that this is a generator, or a DC/DC converter, or the combination thereof. If the power source is made redundant, similar effects can be obtained. In FIG. 10 and FIG. 13, the wheel brakes are connected to two wheels on the front side; however, it may be configured such that the wheel brakes are mounted on two wheels on the rear side; or the wheel brakes are connected to two wheels on the front side and the wheel brakes are connected to two wheels on the rear side. The wheel brakes are mounted on a plurality of wheels, whereby the vehicle can be safely stopped, also in the occurrence of a failure.

Moreover, a feature of Embodiment 2 is a method of controlling the first power source relay switching element 5a, the second power source relay switching element 5b, the third power source relay switching element 5c, and the fourth power source relay switching element 5d in the case where multiple power sources are connected to the wheel brakes. The reason why the multiple power sources are connected to the wheel brakes is to obtain vehicle braking force even when the power source has a failure. In the case of such a configuration, not only the wheel brakes but also other auxiliary machines (although not shown in the drawing, various types of engine control units (ECUs), headlights, a navigation system, and the like) are connected to the respective power sources; and accordingly, there is a concern that other auxiliary sources also fail in linkage when the wheel brakes fail. In order to obtain vehicle braking force continuously while preventing such a failure, it becomes important to control the first power source relay switching element 5a, the second power source relay switching element 5b, the third power source relay switching element 5c, and the fourth power source relay switching element 5d.

Embodiment 3

Embodiment 3 will be described on the basis of FIG. 14. FIG. 14 is a control table for explaining a method of controlling a wheel brake in a vehicle electric braking device according to Embodiment 3. FIG. 14 shows a method of controlling a first power source relay switching element 5a, a second power source relay switching element 5b, a third power source relay switching element 5c, and a fourth power source relay switching element 5d.

When there is no failure place in a wheel brake 50, the first power source relay switching element 5a and the second power source relay switching element 5b are turned OFF, the third power source relay switching element 5c and the fourth power source relay switching element 5d are turned ON, and power is fed from a battery 9c to a first inverter circuit 3a of a first control unit 1a and a second inverter circuit 3b of a second control unit 1b. Then, driving indication of turning ON is outputted to the first inverter circuit 3a of the first control unit 1a and driving indication of turning ON is outputted to the second inverter circuit 3b of the second control unit 1b.

When a failure occurs in the first inverter circuit 3a of the first control unit 1a, the operation thereof is performed such that the first power source relay switching element 5a, the second power source relay switching element 5b, and the third power source relay switching element 5c are turned OFF, the fourth power source relay switching element 5d is kept ON continuously, driving indication to the first inverter circuit 3a of the first control unit 1a is turned OFF, and driving indication to the second inverter circuit 3b of the second control unit 1b is kept ON continuously. It is possible to suppress an influence on other auxiliary machine by disconnecting a failed system from the battery and to obtain vehicle braking force continuously by continuing the operation in a normal system.

When a failure occurs in the second inverter circuit 3b of the second control unit 1b, the operation thereof is performed such that the first power source relay switching element 5a, the second power source relay switching element 5b, and the fourth power source relay switching element 5d are turned OFF, the third power source relay switching element 5c is kept ON continuously, driving indication to the second inverter circuit 3b of the second control unit 1b is turned OFF, and driving indication to the first inverter circuit 3a of the first control unit 1a is kept ON continuously. It is possible to suppress an influence on other auxiliary machine by disconnecting a failed system from the battery and to obtain vehicle braking force continuously by continuing the operation in a normal system.

Also, when a failure occurs in a motor 2, the same effects can be obtained by performing the same operation as the case where a failure occurs in the first inverter circuit 3a of the first control unit 1a and the second inverter circuit 3b of the second control unit 1b. More specifically, when a failure occurs in the motor 2 on the first inverter circuit 3a side of the first control unit 1a, the operation thereof is performed such that the first power source relay switching element 5a, the second power source relay switching element 5b, and the third power source relay switching element 5c are turned OFF, the fourth power source relay switching element 5d is kept ON continuously, driving indication to the first inverter circuit 3a of the first control unit 1a is turned OFF, and driving indication to the second inverter circuit 3b of the second control unit 1b is kept ON continuously. It is possible to suppress an influence on other auxiliary machine by disconnecting a failed system from the battery and to obtain vehicle braking force continuously by continuing the operation in a normal system.

When a failure occurs in the motor 2 on the second inverter circuit 3b side of the second control unit 1b, the operation thereof is performed such that the first power source relay switching element 5a, the second power source relay switching element 5b, and the fourth power source relay switching element 5d are turned OFF, the third power source relay switching element 5c is kept ON continuously, driving indication to the second inverter circuit 3b of the second control unit 1b is turned OFF, and driving indication to the first inverter circuit 3a of the first control unit 1a is kept ON continuously. It is possible to suppress an influence on other auxiliary machine by disconnecting a failed system from the battery and to obtain vehicle braking force continuously by continuing the operation in a normal system.

Embodiment 4

Embodiment 4 will be described on the basis of FIG. 15. FIG. 15 is a control table for explaining a method of controlling a wheel brake in a vehicle electric braking device according to Embodiment 4. FIG. 15 shows a method of controlling a first power source relay switching element 5a, a second power source relay switching element 5b, a third power source relay switching element 5c, and a fourth power source relay switching element 5d.

When there is no failure place in a wheel brake 50, the first power source relay switching element 5a and the second power source relay switching element 5b are turned ON, the third power source relay switching element 5c and the fourth power source relay switching element 5d are turned OFF, power is fed from a first battery 9a to a first inverter circuit 3a of a first control unit 1a, and power is fed from a second battery 9b to a second inverter circuit 3b of a second control unit 1b. Then, driving indication of turning ON is outputted to the first inverter circuit 3a of the first control unit 1a and driving indication of turning ON is outputted to the second inverter circuit 3b of the second control unit 1b.

When a failure occurs in the first inverter circuit 3a of the first control unit 1a, the operation thereof is performed such that the first power source relay switching element 5a, the third power source relay switching element 5c, and the fourth power source relay switching element 5d are turned OFF, the second power source relay switching element 5b is kept ON continuously, driving indication to the first inverter circuit 3a of the first control unit 1a is turned OFF, and driving indication to the second inverter circuit 3b of the second control unit 1b is kept ON continuously. It is possible to suppress an influence on other auxiliary machine by disconnecting a failed system from the battery and to obtain vehicle braking force continuously by continuing the operation in a normal system.

When a failure occurs in the second inverter circuit 3b of the second control unit 1b, the operation thereof is performed such that the second power source relay switching element 5b, the third power source relay switching element 5c, and the fourth power source relay switching element 5d are turned OFF, the first power source relay switching element 5a is kept ON continuously, driving indication to the second inverter circuit 3b of the second control unit 1b is turned OFF, and driving indication to the first inverter circuit 3a of the first control unit 1a is kept ON continuously. It is possible to suppress an influence on other auxiliary machine by disconnecting a failed system from the battery and to obtain vehicle braking force continuously by continuing the operation in a normal system.

Also, when a failure occurs in a motor 2, the same effects can be obtained by performing the same operation as the case where a failure occurs in the first inverter circuit 3a of the first control unit 1a and the second inverter circuit 3b of the second control unit 1b. More specifically, when a failure occurs in the motor 2 on the first inverter circuit 3a side of the first control unit 1a, the operation thereof is performed such that the first power source relay switching element 5a, the third power source relay switching element 5c, and the fourth power source relay switching element 5d are turned OFF, the second power source relay switching element 5b is kept ON continuously, driving indication to the first inverter circuit 3a of the first control unit 1a is turned OFF, and driving indication to the second inverter circuit 3b of the second control unit 11b is kept ON continuously. It is possible to suppress an influence on other auxiliary machine by disconnecting a failed system from the battery and to obtain vehicle braking force continuously by continuing the operation in a normal system.

When a failure occurs in the motor 2 on the second inverter circuit 3b side of the second control unit 1b, the operation thereof is performed such that the second power source relay switching element 5b, the third power source relay switching element 5c, and the fourth power source relay switching element 5d are turned OFF, the first power source relay switching element 5a is kept ON continuously, driving indication to the second inverter circuit 3b of the second control unit 1b is turned OFF, and driving indication to the first inverter circuit 3a of the first control unit 1a is kept ON continuously. It is possible to suppress an influence on other auxiliary machine by disconnecting a failed system from the battery and to obtain vehicle braking force continuously by continuing the operation in a normal system.

Embodiment 5

Embodiment 5 will be described on the basis of FIG. 16. FIG. 16 is a control table for explaining a method of controlling a wheel brake in a vehicle electric braking device according to Embodiment 5. FIG. 16 shows a method of controlling a first power source relay switching element 5a, a second power source relay switching element 5b, a third power source relay switching element 5c, and a fourth power source relay switching element 5d.

When there is no failure place in a wheel brake 50, all the first power source relay switching element 5a, the second power source relay switching element 5b, the third power source relay switching element 5c, and the fourth power source relay switching element 5d are turned ON, power is fed from a first battery 9a and a third battery 9c to a first inverter circuit 3a of a first control unit 1a, and power is fed from a second battery 9b and a third battery 9c to a second inverter circuit 3b of a second control unit 1b. Then, driving indication of turning ON is outputted to the first inverter circuit 3a of the first control unit 1a and driving indication of turning ON is outputted to the second inverter circuit 3b of the second control unit 1b.

When a failure occurs in the first inverter circuit 3a of the first control unit 1a, the operation thereof is performed such that the first power source relay switching element 5a and the third power source relay switching element 5c are turned OFF, the second power source relay switching element 5b and the fourth power source relay switching element 5d are kept ON continuously, driving indication to the first inverter circuit 3a of the first control unit 1a is turned OFF, and driving indication to the second inverter circuit 3b of the second control unit 1b is kept ON continuously. It is possible to suppress an influence on other auxiliary machine by disconnecting a failed system from the battery and to obtain vehicle braking force continuously by continuing the operation in a normal system.

When a failure occurs in the second inverter circuit 3b of the second control unit 1b, the operation thereof is performed such that the second power source relay switching element 5b and the fourth power source relay switching element 5d are turned OFF, the first power source relay switching element 5a and the third power source relay switching element 5c are kept ON continuously, driving indication to the second inverter circuit 3b of the second control unit 1b is turned OFF, and driving indication to the first inverter circuit 3a of the first control unit 1a is kept ON continuously. It is possible to suppress an influence on other auxiliary machine by disconnecting a failed system from the battery and to obtain vehicle braking force continuously by continuing the operation in a normal system.

Also, when a failure occurs in a motor 2, the same effects can be obtained by performing the same operation as the case where a failure occurs in the first inverter circuit 3a of the first control unit 1a and the second inverter circuit 3b of the second control unit 1b. More specifically, when a failure occurs in the motor 2 on the first inverter circuit 3a side of the first control unit 1a, the operation thereof is performed such that the first power source relay switching element 5a and the third power source relay switching element 5c are turned OFF, the second power source relay switching element 5b and the fourth power source relay switching element 5d are kept ON continuously, driving indication to the first inverter circuit 3a of the first control unit 1a is turned OFF, and driving indication to the second inverter circuit 3b of the second control unit 1b is kept ON continuously. It is possible to suppress an influence on other auxiliary machine by disconnecting a failed system from the battery and to obtain vehicle braking force continuously by continuing the operation in a normal system.

When a failure occurs in the motor 2 on the second inverter circuit 3b side of the second control unit 1b, the operation thereof is performed such that the second power source relay switching element 5b and the fourth power source relay switching element 5d are turned OFF, the first power source relay switching element 5a and the third power source relay switching element 5c are kept ON continuously, driving indication to the second inverter circuit 3b of the second control unit 1b is turned OFF, and driving indication to the first inverter circuit 3a of the first control unit 1a is kept ON continuously. It is possible to suppress an influence on other auxiliary machine by disconnecting a failed system from the battery and to obtain vehicle braking force continuously by continuing the operation in a normal system.

In the control methods described in FIG. 14 and FIG. 15, an effect exists in that a piece of apparatus can be prevented from being broken down by the influence of an inrush current due to the potential difference between the batteries. In the control method described in FIG. 16, the inverter circuit can be driven by a plurality of batteries; thus, high output power of the motor is achieved and braking force as the vehicle can be enhanced.

Furthermore, in this embodiment, the description has been made, as examples of the vehicle having four wheels; however, the present application is not limited thereto and is applicable as long as the configuration is such that the vehicle is mounted with wheels, material subjected to friction which rotates together with the wheels and friction material which moves by power of the motor are provided, vehicle braking force is obtained by pressing the friction material to the material subjected to friction.

The present application describes various exemplified embodiments and examples; however, various features, aspects, and functions described in one or a plurality of embodiments are not limited to specific embodiments, but are applicable to embodiments individually or in various combinations thereof. Therefore, countless modified examples not exemplified are assumed in technical ranges disclosed in the specification of the specification. For example, there include: a case in which at least one constituent element is modified; a case, added; or a case, deleted; and a case in which at least one constituent element is extracted to combine with constituent elements of other embodiments.

Figure 17:
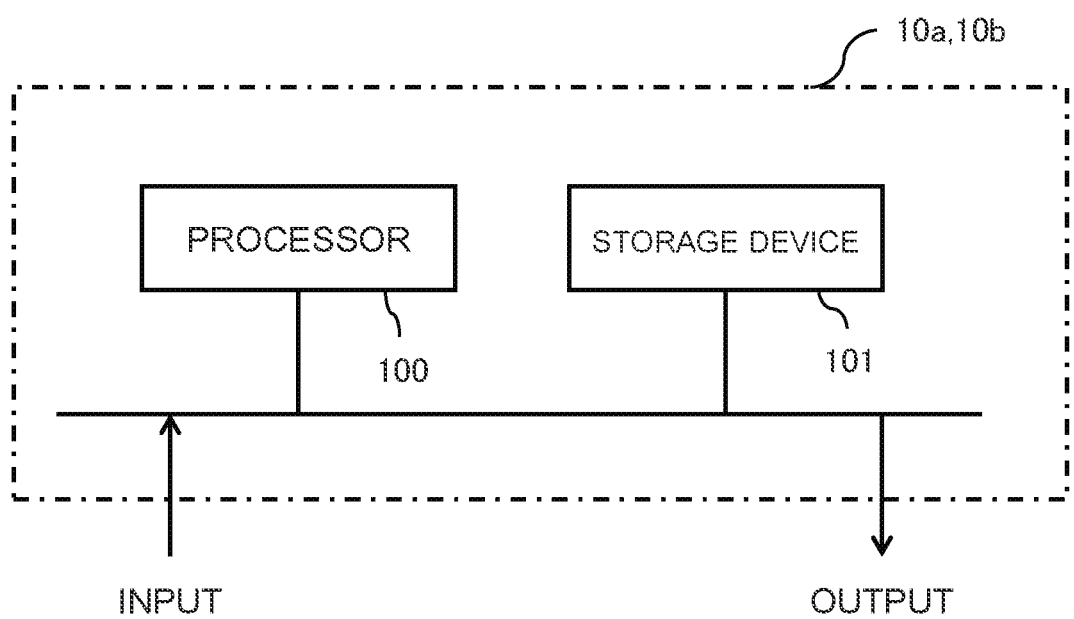
FIG. 17 is a circuit diagram showing hardware of a first CPU and a second CPU in embodiments.

Incidentally, the first CPU 10a and the second CPU 10b are each constituted of a processor 100 and a storage device 101 as shown in FIG. 17 that is an example of hardware. Although the storage device is not shown, a volatile storage device such as a random access memory and a non-volatile auxiliary storage device such as a flash memory, are provided. Furthermore, an auxiliary storage device of a hard disk may be provided instead of the flash memory. The processor 100 executes a program such as a flow chart inputted from the storage device 101. In this case, the program such as the flow chart is inputted from auxiliary storage device to the processor 100 via the volatile storage device. Furthermore, the processor 100 may output data such as a calculation result to the volatile storage device of the storage device 101 or may store the data in the auxiliary storage device of the volatile storage device.

INDUSTRIAL APPLICABILITY

The present application is suitable for actualizing a vehicle electric braking device and a method of controlling the same, which can safely stop a vehicle.

DESCRIPTION OF REFERENCE NUMERALS

1a First control unit, 1b Second control unit, 2 Motor, 2a First coil winding, 2b Second coil winding, 3a First inverter circuit, 3b Second inverter circuit, 4a First control circuit section, 4b Second control circuit section, 5a First power source relay switching element, 5b Second power source relay switching element, 5c Third power source relay switching element, 5d Fourth power source relay switching element, 9 Battery, 9a First battery, 9b Second battery, 9c Third battery, 10a First CPU, 10b Second CPU, 11a First output circuit, 11b Second output circuit, 40 Brake mechanism, 40a Brake mechanism, 40b Brake mechanism, 40c Brake mechanism, 40d Brake mechanism, 41a Wheel, 41b Wheel, 41c Wheel, 41d Wheel, 50 Wheel brake, 50a Wheel brake, 50b Wheel brake, 50c Wheel brake, 50d Wheel brake, Vehicle

The invention claimed is:

1. A vehicle electric braking device comprising a wheel brake which is connected to a power source mounted on a vehicle and performs braking operation of a brake mechanism of wheels of the vehicle,
   wherein the wheel brake includes:
   a motor which has two sets of independent coil windings, a first coil winding and a second coil winding, and drives a braking mechanism of the wheels of the vehicle;
   a first controller which is connected to the first coil winding of the motor and controls the motor; and
   a second controller which is connected to the second coil winding of the motor and controls the motor, and
   wherein the first controller includes: the first inverter circuit which supplies a current to the first coil winding of the motor; and a first control circuit section which is mounted with a first output circuit that outputs a control signal which is for driving the motor and a first central processing unit which calculates a control amount of the motor and outputs a control signal to the first output circuit, and
   a first power source relay circuit that interrupts the current supplied to the first coil winding of the motor, and
   wherein the second controller includes: a second inverter circuit which supplies a current to the second coil winding of the motor; and a second control circuit section which is mounted with a second output circuit that outputs a control signal which is for driving the motor and a second central processing unit which calculates a control amount of the motor and outputs a control signal to the second output circuit, and
   a second power source relay circuit that interrupts the current supplied to the second coil winding of the motor, and
   wherein the wheel brake is provided on at least any one of the wheels of the vehicle, and
   wherein the power source is constituted of a first power source, a second power source, and a third power source; the first power source is connected to the first controller of the wheel brake; the second power source is connected to the second controller of the wheel brake; the third power source is connected to the first controller and the second controller of the wheel brake; a third power source relay circuit is arranged between the third power source and the first inverter circuit; and a fourth power source relay circuit is arranged between the third power source and the second inverter circuit.

2. The vehicle electric braking device according to claim 1,
   further comprising an abnormality detection means on each of the first controller and the second controller of the wheel brake, and
   wherein, when an abnormality is detected in either the first controller or the second controller by the abnormality detection means, the first power source relay circuit or the second power source relay circuit of either the first controller or the second controller, by which the abnormality is detected, is turned OFF.

3. The vehicle electric braking device according to claim 1,
further comprising an abnormality detection means on each of the first controller and the second controller of the wheel brake, and
wherein, when an abnormality is detected in either the first controller or the second controller by the abnormality detection means, the first power source relay circuit or the second power source relay circuit of either the first controller or the second controller, by which the abnormality is detected, is turned OFF; and the output of the control signal to the first output circuit or the second output circuit is stopped.

4. The vehicle electric braking device according to claim 1,
further comprising an abnormality detection means on each of the first controller and the second controller of the wheel brake, and
wherein, when an abnormality is detected in either the first controller or the second controller by the abnormality detection means, the first power source relay circuit or the second power source relay circuit of either the first controller or the second controller, by which the abnormality is detected, is turned OFF; and the first power source relay circuit or the second power source relay circuit of either the first controller or the second controller, by which the abnormality is not detected, is kept ON.

5. The vehicle electric braking device according to claim 4,
wherein the first output circuit or the second output circuit is controlled so as to supply shared a current less than 100% of a current required for the wheel brake in a normal state where the first controller or the second controller is no abnormality and is configured so as to have a capacity exceeding one time with respect to allowable current capacity or thermal capacity.

6. The vehicle electric braking device according to claim 5,
wherein the abnormality detection means detects an abnormality of a self controller and a counterpart controller; and the self controller continues 100% control when it is determined that the self controller is normal and the counterpart controller is abnormal.

7. The vehicle electric braking device according to claim 4,
wherein the first output circuit or the second output circuit is controlled so as to supply a current of 50% of a current required for the wheel brake and is configured so as to have a capacity of two times with respect to allowable current capacity or thermal capacity.

8. The vehicle electric braking device according to claim 7,
wherein the abnormality detection means detects an abnormality of a self controller and a counterpart controller; and the self controller controls in excess of 50% when it is determined that the self controller is normal and the counterpart controller is abnormal.

9. The vehicle electric braking device according to claim 2,
wherein the abnormality detection means detects an abnormality of the self controller and the counterpart controller, and is equipped with a notification device that notifies the abnormality when it is detected that the self controller or the counterpart controller is abnormal.

10. The vehicle electric braking device according to claim 1,
wherein at least any one of the first power source relay circuit of the first controller, the third power source relay circuit of the first controller, the second power source relay circuit of the second controller, and the fourth power source relay circuit of the second controller is turned ON.

11. The vehicle electric braking device according to claim 1,
further comprising an abnormality detection means on each of the first controller and the second controller of the wheel brake, and
wherein, when an abnormality is detected in either the first controller or the second controller by the abnormality detection means, the first power source relay circuit and the third power source relay circuit, or the second power source relay circuit and the fourth power source relay circuit of either the first controller or the second controller, by which the abnormality is detected, are turned OFF.

12. The vehicle electric braking device according to claim 1,
further comprising an abnormality detection means on each of the first controller and the second controller of the wheel brake, and
wherein, when an abnormality is detected in either the first controller or the second controller by the abnormality detection means, the first power source relay circuit and the third power source relay circuit, or the second power source relay circuit and the fourth power source relay circuit of either the first controller or the second controller, by which the abnormality is detected, are turned OFF; and the output of the control signal to the first output circuit or the second output circuit is stopped.

13. The vehicle electric braking device according to claim 1,
further comprising an abnormality detection means on each of the first controller and the second controller of the wheel brake, and
wherein, when an abnormality is detected in either the first controller or the second controller by the abnormality detection means, the first power source relay circuit and the third power source relay circuit, or the second power source relay circuit and the fourth power source relay circuit of either the first controller or the second controller, by which the abnormality is detected, are turned OFF; and at least any one of the first power source relay circuit and the third power source relay circuit, or the second power source relay circuit and the fourth power source relay circuit of either the first controller or the second controller, by which the abnormality is not detected, are kept ON.

14. The vehicle electric braking device according to claim 13,
wherein the first output circuit or the second output circuit is controlled so as to supply a current less than 100% of a current required for the wheel brake and is configured so as to have a capacity exceeding one time with respect to allowable current capacity or thermal capacity.

15. The vehicle electric braking device according to claim 13,
wherein the abnormality detection means detects an abnormality of a self controller and a counterpart controller; and the self controller continues 100% control when it is determined that the self controller is normal and the counterpart controller is abnormal.

16. The vehicle electric braking device according to claim 13,
wherein the first output circuit or the second output circuit is controlled so as to supply a current of 50% of a current required for the wheel brake and is configured so as to have a capacity of two times with respect to allowable current capacity or thermal capacity.

17. The vehicle electric braking device according to claim 16,
wherein the abnormality detection means detects an abnormality of a self controller and a counterpart controller; and the self controller controls in excess of 50% when it is determined that the self controller is normal and the counterpart controller is abnormal.

18. The vehicle electric braking device according to claim 17,
wherein the abnormality detection means detects an abnormality of the self controller and the counterpart controller, and is equipped with a notification device that notifies the abnormality when it is detected that the self controller or the counterpart controller is abnormal.

19. A method of controlling a vehicle electric braking device comprising a wheel brake which includes: a motor which has two sets of independent coil windings, a first coil winding and a second coil winding, and drives a braking mechanism of wheels of a vehicle; a first controller which is connected to the first coil winding of the motor and controls the motor; and a second controller which is connected to the second coil winding of the motor and controls the motor, the method comprising the steps of:
turning OFF a first power source relay circuit and a second power source relay circuit, turning ON a third power source relay circuit and a fourth power source relay circuit, feeding power from a third power source to the first controller and the second controller, and outputting driving indication of turning ON to a first inverter circuit of the first controller and driving indication of turning ON to a second inverter circuit of the second controller, when no failure occurs in the wheel brake;
turning OFF the first power source relay circuit, the second power source relay circuit, and the third power source relay circuit, keeping the fourth power source relay circuit ON continuously, turning OFF driving indication to the first inverter circuit of the first controller, and keeping driving indication to the second inverter circuit of the second controller ON continuously, when a failure occurs in the first inverter circuit of the first controller;
turning OFF the first power source relay circuit, the second power source relay circuit, and the fourth power source relay circuit, keeping the third power source relay circuit ON continuously, turning OFF driving indication to the second inverter circuit of the second controller, and keeping driving indication to the first inverter circuit of the first controller ON continuously, when a failure occurs in the second inverter circuit of the second controller;
turning OFF the first power source relay circuit, the second power source relay circuit, and the third power source relay circuit, keeping the fourth power source relay circuit ON continuously, turning OFF driving indication to the first inverter circuit of the first controller, and keeping driving indication to the second inverter circuit of the second controller ON continuously, when a failure occurs in the motor on the first inverter circuit side of the first controller; and
turning OFF the first power source relay circuit, the second power source relay circuit, and the fourth power source relay circuit, keeping the third power source relay circuit ON continuously, turning OFF driving indication to the second inverter circuit of the second controller, and keeping driving indication to the first inverter circuit of the first controller ON continuously, when a failure occurs in the motor on the second inverter circuit side of the second controller.

20. A method of controlling a vehicle electric braking device comprising a wheel brake which includes: a motor which has two sets of independent coil windings, a first coil winding and a second coil winding, and drives a braking mechanism of wheels of a vehicle; a first controller which is connected to the first coil winding of the motor and controls the motor; and a second controller which is connected to the second coil winding of the motor and controls the motor, the method comprising the steps of:
turning ON a first power source relay circuit and a second power source relay circuit, turning OFF a third power source relay circuit and a fourth power source relay circuit, feeding power from a first power source to the first controller, feeding power from a second power source to the second controller, and outputting driving indication of turning ON to a first inverter circuit of the first controller and driving indication of turning ON to a second inverter circuit of the second controller, when no failure occurs in the wheel brake;
turning OFF the first power source relay circuit, the third power source relay circuit, and the fourth power source relay circuit, keeping the second power source relay circuit ON continuously, turning OFF driving indication to the first inverter circuit of the first controller, and keeping driving indication to the second inverter circuit of the second controller ON continuously, when a failure occurs in the first inverter circuit of the first controller;
turning OFF the second power source relay circuit, the third power source relay circuit, and the fourth power source relay circuit, keeping the first power source relay circuit ON continuously, turning OFF driving indication to the second inverter circuit of the second controller, and keeping driving indication to the first inverter circuit of the first controller ON continuously, when a failure occurs in the second inverter circuit of the second controller;
turning OFF the first power source relay circuit, the third power source relay circuit, and the fourth power source relay circuit, keeping the second power source relay circuit ON continuously, turning OFF driving indication to the first inverter circuit of the first controller, and keeping driving indication to the second inverter circuit of the second controller ON continuously, when a failure occurs in the motor on the first inverter circuit side of the first controller; and
turning OFF the second power source relay circuit, the third power source relay circuit, and the fourth power source relay circuit, keeping the first power source relay circuit ON continuously, turning OFF driving indication to the second inverter circuit of the second controller, and keeping driving indication to the first inverter circuit of the first controller ON continuously, when a failure occurs in the motor on the second inverter circuit side of the second controller.

21. A method of controlling a vehicle electric braking device comprising a wheel brake which includes: a motor which has two sets of independent coil windings, a first coil winding and a second coil winding, and drives a braking mechanism of wheels of a vehicle; a first controller which is connected to the first coil winding of the motor and controls the motor; and a second controller which is connected to the second coil winding of the motor and controls the motor, the method comprising the steps of:

turning ON a first power source relay circuit, a second power source relay circuit, a third power source relay circuit, and a fourth power source relay circuit, feeding power from a third power source to the first control unit, the second control unit, the third power source relay circuit, and the fourth power source relay circuit, and outputting driving indication of turning ON to a first inverter circuit of the first controller and driving indication of turning ON to a second inverter circuit of the second controller, when no failure occurs in the wheel brake;

turning OFF the first power source relay circuit and the third power source relay circuit, keeping the second power source relay circuit and the fourth power source relay circuit ON continuously, turning OFF driving indication to the first inverter circuit of the first controller, and keeping driving indication to the second inverter circuit of the second controller ON continuously, when a failure occurs in the first inverter circuit of the first controller;

turning OFF the second power source relay circuit and the fourth power source relay circuit, keeping the first power source relay circuit and the third power source relay circuit ON continuously, turning OFF driving indication to the second inverter circuit of the second controller, and keeping driving indication to the first inverter circuit of the first controller ON continuously, when a failure occurs in the second inverter circuit of the second controller;

turning OFF the first power source relay circuit and the third power source relay circuit, keeping the second power source relay circuit and the fourth power source relay circuit ON continuously, turning OFF driving indication to the first inverter circuit of the first controller, and keeping driving indication to the second inverter circuit of the second controller ON continuously, when a failure occurs in the motor on the first inverter circuit side of the first controller; and turning OFF the second power source relay circuit and the fourth power source relay circuit, keeping the first power source relay circuit and the third power source relay circuit ON continuously, turning OFF driving indication to the second inverter circuit of the second controller, and keeping driving indication to the first inverter circuit of the first controller ON continuously, when a failure occurs in the motor on the second inverter circuit side of the second controller.

* * * * *